US010604043B2

(12) United States Patent
Onuma et al.

(10) Patent No.: US 10,604,043 B2
(45) Date of Patent: Mar. 31, 2020

(54) SEAT FRAME

(71) Applicants: TS TECH CO., LTD., Asaka-shi, Saitama (JP); HONDA MOTOR CO., LTD., Tokyo (JP)

(72) Inventors: Koji Onuma, Tochigi (JP); Hiroshi Baba, Tochigi (JP); Taiji Misono, Saitama (JP); Toshimitsu Mizukoshi, Saitama (JP); Masaki Shimazu, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 15/883,364

(22) Filed: Jan. 30, 2018

(65) Prior Publication Data
US 2018/0215295 A1  Aug. 2, 2018

(30) Foreign Application Priority Data
Feb. 2, 2017  (JP) .................... 2017-017826

(51) Int. Cl.
| | |
|---|---|
| *B60N 2/68* | (2006.01) |
| *B60N 2/01* | (2006.01) |
| *B60N 2/64* | (2006.01) |
| *B60N 2/42* | (2006.01) |

(52) U.S. Cl.
CPC .............. *B60N 2/682* (2013.01); *B60N 2/01* (2013.01); *B60N 2/4235* (2013.01); *B60N 2/643* (2013.01); *B60N 2/68* (2013.01)

(58) Field of Classification Search
CPC ........ B60N 2/682; B60N 2/01; B60N 2/4235; B60N 2/643; B60N 2/68
USPC ..................................... 297/452.18
See application file for complete search history.

(56) References Cited

U.S. PATENT DOCUMENTS

| 2010/0244538 A1 | 9/2010 | Gross et al. |
| 2012/0068506 A1 | 3/2012 | Yamaki et al. |
| (Continued) | | |

FOREIGN PATENT DOCUMENTS

| DE | 10 2009 035 405 A1 | 2/2010 |
| DE | 10 2014 211 526 A1 | 12/2014 |
| JP | 2015-003598 A | 1/2015 |
| (Continued) | | |

OTHER PUBLICATIONS

Extended European Search Report issued in related application EP 18154406.5, dated Jun. 29, 2018, 7 pages.

*Primary Examiner* — Anthony D Barfield
(74) *Attorney, Agent, or Firm* — Faegre Drinker Biddle & Reath LLP

(57) ABSTRACT

It is intended to expand a space at a back portion of a lower portion of a seat. A seat frame includes a lower frame configured to couple lower portions of side frames arranged on right and left sides. The lower frame includes a back wall portion provided on a back side, a front wall portion provided in front of the back wall portion, and a coupling portion that couples lower ends of the back wall portion and the front wall portion. The back wall portion includes a pair of side portions forming ends in a seat width direction and each formed along the outer shapes of the side frames, and an inclined portion provided between the side portions and inclined such that a lower end is positioned in front of an upper end. The inclined portion is provided in front of the side portions.

11 Claims, 21 Drawing Sheets

(56) References Cited

U.S. PATENT DOCUMENTS

2014/0375099 A1 12/2014 Kitou et al.
2015/0091359 A1  4/2015 Kitou

FOREIGN PATENT DOCUMENTS

WO   2009/056294 A1   5/2009
WO   2016/175212 A1  11/2016

SEAT FRAME

CROSS REFERENCE TO RELATED APPLICATIONS

This application is based upon and claims the priority benefit of Japanese Patent Application No. JP 2017-017826, filed Feb. 2, 2017, the contents being incorporated herein by reference.

BACKGROUND

The present disclosure relates to a seat frame configured such that a space at a back portion of a seat is expanded.

Size reduction has been demanded for a seat frame forming a framework of a seat mounted on a conveyance such as an automobile. In particular, the feet of an occupant on a back seat are arranged in a space below a back portion of a front seat, and therefore, it has been demanded to expand the space at such a portion. A seat frame has been typically known in which a section of a lower frame (e.g., a lower cross member) forming a lower portion of a seat back frame is in a substantially J-like shape as described in Japanese Patent Publication JP 2015-003598, for example.

In the above-described typical technique, a back portion of the lower frame is at the substantially same position as a back end of a side frame. For this reason, there is a problem that a space below a back portion of a seat cannot be sufficiently ensured.

SUMMARY

The present disclosure has been made in view of the above-described problem, and various embodiments provide a seat frame configured so that a space at a back portion of a lower portion of a seat can be expanded.

The above-described problem is solved by a seat frame of the present disclosure. The seat frame is a seat frame including a lower frame configured to couple lower portions of side frames arranged on right and left sides. The lower frame includes a back wall portion provided on a back side, a front wall portion provided in front of the back wall portion, and a coupling portion coupling lower ends of the back wall portion and the front wall portion. The back wall portion includes a pair of side portions forming ends in a seat width direction and each side portion of the pair formed along the outer shapes of the side frames, and an inclined portion provided between the side portions and inclined such that a lower end of the inclined portion is positioned in front of an upper end of the inclined portion. The inclined portion is provided in front of the side portions. According to the above-described seat frame, a space behind a lower portion of a seat can be expanded. That is, according to the above-described seat frame, a foot placement space for a back seat can be expanded.

Moreover, in the above-described seat frame, a reinforcement portion may be provided at the inclined portion. With this configuration, the stiffness of the inclined portion of the lower frame can be improved.

Further, in the above-described seat frame, respective connection portions configured to connect the inclined portion and each corresponding side portion together may be provided, each of the connection portions includes an inner portion configured to connect the inclined portion and the connection portion, and an outer portion configured to connect the connection portion and the corresponding side portion, and the inner portion may be positioned in front of the outer portion. With this configuration, the space behind the lower frame can be expanded.

In addition, in the above-described seat frame, a spacing interval between the inclined portion and the front wall portion may gradually expand from bottom up. With this configuration, the size of a lower portion of the lower frame can be reduced. Thus, a foot placement space for a back seat can be expanded.

Moreover, the above-described seat frame may further include a rotary shaft configured to rotatably couple a seat back frame and a seat cushion frame together. The back wall portion may be provided behind the rotary shaft, and the front wall portion may be provided in front of the rotary shaft. With this configuration, the rotary shaft can be protected by the lower frame.

Further, in the above-described seat frame, the front wall portion may be provided substantially parallel with a support surface configured to support an occupant. With this configuration, the occupant can be stably supported.

In addition, in the above-described seat frame, an end portion of the lower frame in the seat width direction may be formed in a shape along each side frame, and a section of the back wall portion, a section of the front wall portion, and a section of the coupling portion in an area where the inclined portion is provided may overlap with each side frame as viewed laterally. With this configuration, the size of the lower frame can be reduced. Thus, the foot placement space for the back seat can be expanded.

Moreover, the above-described seat frame may further include a reclining unit configured to control rotation of the seat back frame relative to the seat cushion frame. The inclined portion may be, as viewed laterally, provided on the inside of the reclining unit. With this configuration, the size of the lower frame can be reduced. Thus, the foot placement space for the back seat can be expanded.

Further, in the above-described seat frame, the reclining unit may be welded to each side frame, and the inclined portion may be, as viewed laterally, provided at a position that overlaps with a welding position between the reclining unit and each side frame. With this configuration, the size of the lower frame can be reduced. Thus, the foot placement space for the back seat can be expanded.

In addition, in the above-described seat frame, an end of the inclined portion in the seat width direction may be positioned the outside of a pressure receiving member configured to support an occupant. With this configuration, a space can be expanded across a large area behind the lower frame.

Moreover, in the above-described seat frame, an attachment portion for the pressure receiving member of the seat cushion frame may be positioned in front of a plane that extends from the inclined portion. With this configuration, the space behind the lower frame can be expanded.

According to an embodiment of the present disclosure, the space behind the lower portion of the seat can be expanded. According to an embodiment of the present disclosure, the stiffness of the inclined portion of the lower frame can be improved. According to an embodiment of the present disclosure, the space behind the lower frame can be expanded. According to an embodiment of the present disclosure, the size of the lower portion of the lower frame can be reduced. According to an embodiment of the present disclosure, the rotary shaft can be protected by the lower frame. According to an embodiment of the present disclosure, the occupant can be stably supported. According to an embodiment of the present disclosure, the size of the lower frame can be reduced. According to an embodiment of the present disclosure, the space can be expanded across the large area behind the lower frame. According to an embodiment of the present disclosure, the space behind the lower frame can be expanded.

BRIEF DESCRIPTION OF THE DRAWINGS

Various embodiments of the present disclosure are illustrated in the drawings, in which.

DETAILED DESCRIPTION

A seat frame 1 according to an embodiment (hereinafter referred to as a "present embodiment") of the present disclosure is described below with reference to FIGS. 1 to 12D. The seat frame 1 forms a framework of a vehicle seat mounted on a vehicle. Note that the embodiment described below is set forth merely as an example for the sake of easy understanding of the present disclosure, and is not intended to limit the present disclosure. That is, changes and modifications can be made to the shapes, dimensions, arrangements, etc. of members described below without departing from the gist of the present disclosure, and needless to say, the present disclosure includes equivalents thereof.

In description below, a "front-to-back direction" means a front-to-back direction as viewed from a person seated on the vehicle seat, the front-to-back direction being coincident with a travelling direction of the vehicle. A "seat width direction" means a horizontal width direction of the vehicle seat, the seat width direction being coincident with a right-to-left direction as viewed from the person seated on the vehicle seat. Moreover, an "upper-to-lower direction" means a height direction of the vehicle seat, the upper-to-lower direction being coincident with an upper-to-lower direction when the vehicle seat is viewed from the front.

1. Outline of Seat Frame 1

Figure 1:
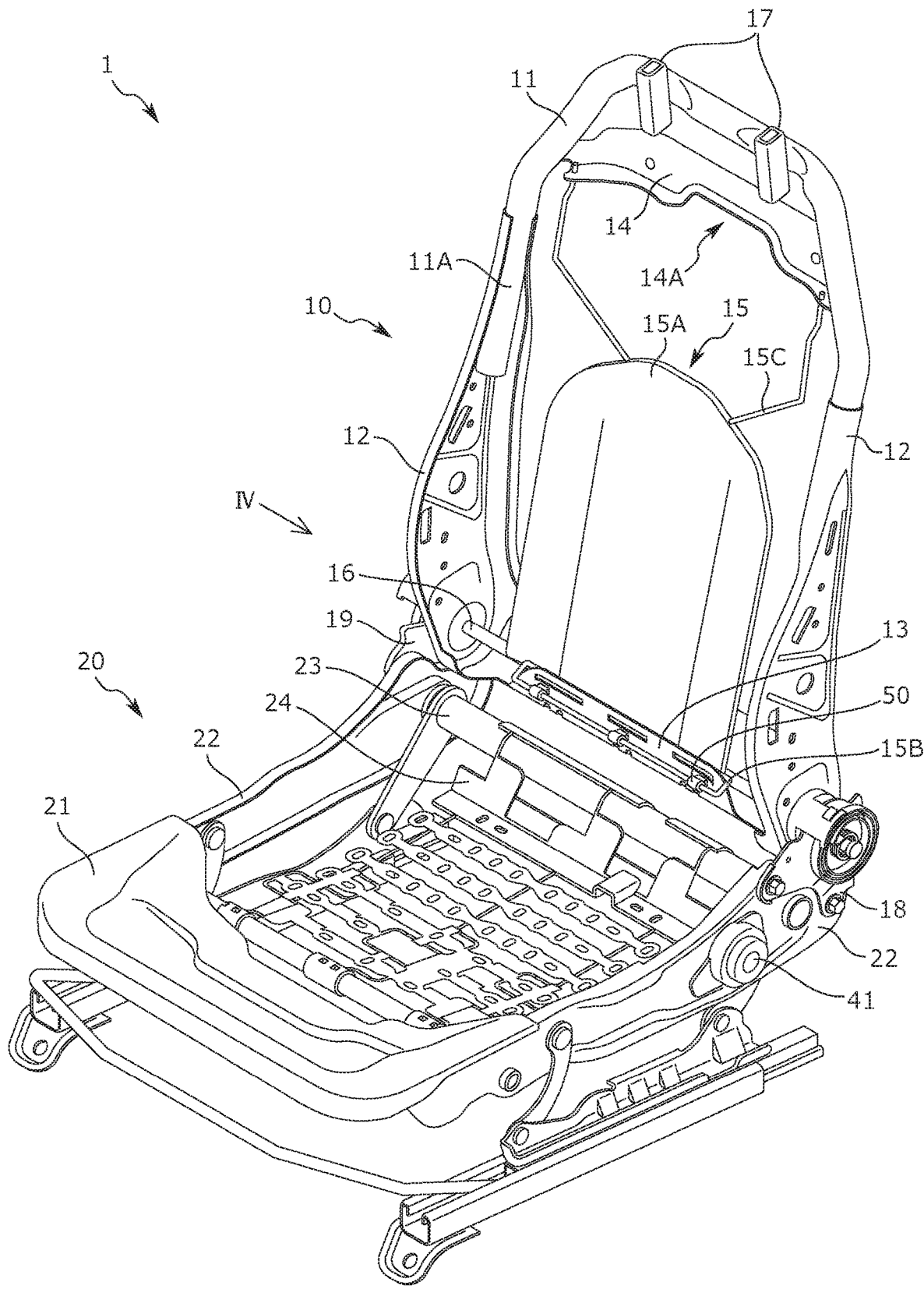
FIG. 1 is a perspective view of a seat frame of an embodiment.

First, an outline configuration of the seat frame 1 is described with reference to FIG. 1. As illustrated in FIG. 1, the seat frame 1 mainly includes a seat back frame 10 and a seat cushion frame 20. The seat back frame 10 forms a framework of a backrest portion of the seat frame 1, and the seat cushion frame 20 forms a seating portion of the seat frame 1.

As illustrated in FIG. 1, the seat back frame 10 includes an inverted U-shaped upper frame 11, a pair of side frames 12 forming right and left end portions in the seat width direction, and a lower frame 13 coupling lower end portions of the side frames 12 together.

The upper frame 11 is welded to the side frames 12 at upper frame side portions 11A forming lower portions of the upper frame 11 on both sides thereof. Moreover, headrest attachment portions 17 are, by welding, attached to an upper end of the upper frame 11. The headrest attachment portions 17 are tubular bodies into which two headrest stays hanging from a not-shown headrest are inserted. Further, a cross member 14 is bridged between both end portions of the upper frame 11 above the upper frame side portions 11A. A recessed portion 14A recessed upward from the seat with respect to right and left portions of the cross member 14 is formed at a center portion of the cross member 14. The recessed portion 14A may be provided between the right and left headrest attachment portions 17. As described above, the weight of the seat frame 1 is reduced by formation of the recessed portion 14A at the cross member 14 in the seat frame 1. Note that the recessed portion 14A is formed at a lower end of the cross member 14, but may be formed at an upper end of the cross member 14. Alternatively, the recessed portion 14A may be formed at both of the upper and lower ends of the cross member 14.

As illustrated in FIG. 1, a rotary shaft 16 for reclining units 40 is, between the lower end portions of the right and left side frames 12, attached with the rotary shaft 16 penetrating the right and left side frames 12. Note that the reclining units 40 are operated by operation of a reclining operation portion so that the angle of the seat back frame 10 with respect to the seat cushion frame 20 can be adjusted.

A pressure receiving member 15 configured to receive a load from an occupant is bridged at a center portion of the seat back frame 10. The pressure receiving member 15 described herein includes a support portion 15A, a wire 15B, and wires 15C. The support portion 15A is configured to support the back of the occupant, and includes an elastic member such as a plate spring or an S-spring. Note that a surface of the support portion 15A on the front side of the seat is referred to as a "support surface." The wire 15B is locked at the support portion 15A and a front wall portion 13B of the lower frame 13. Specifically, the wire 15B is, at the front wall portion 13B of the lower frame 13, locked using clips 50 fitted in through-holes formed at the front wall portion 13B. The wires 15C are locked at an upper end portion of the support portion 15A and the cross member 14. As described above, the support portion 15A is fixed to the seat back frame 10 through the wire 15B and the wires 15C.

Next, the seat cushion frame 20 is described. As illustrated in FIG. 1, the seat cushion frame 20 forms a rectangular frame-shaped outer shape as viewed from the above. The seat cushion frame 20 includes, as main components, a pair of cushion side frames 22 forming right and left end portions in the seat width direction, a pan frame 21 forming a front end portion of the seat cushion frame 20, and a coupling pipe 23 coupling the right and left cushion side frames 22. For example, the coupling pipe 23 is a hollow member such as a round pipe, and a back end of a pressure receiving member 24 configured to support the buttocks of the occupant is attached to the coupling pipe 23.

Figure 4:
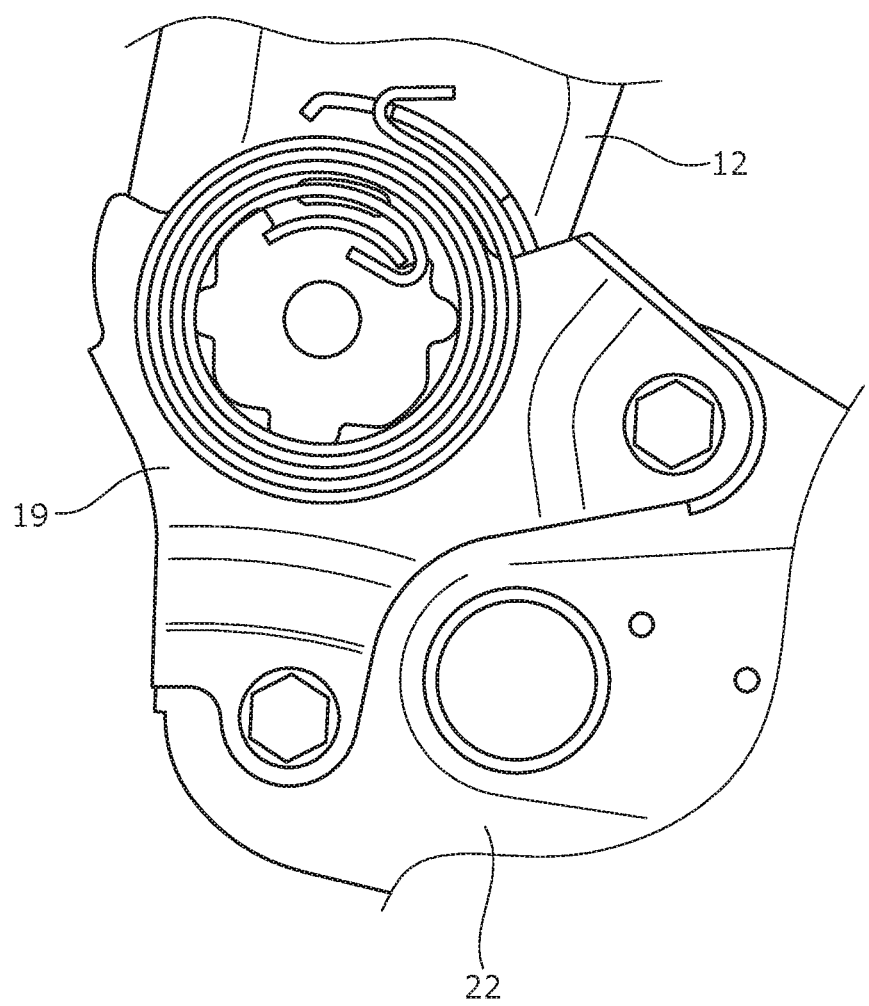
FIG. 4 is a partial enlarged view of the periphery of a second coupling bracket from a view point IV of FIG. 1.

As illustrated in FIG. 1, a first coupling bracket 18 is attached to an upper portion of a back end portion of the left cushion side frame 22. Moreover, the left side frame 12 is coupled with the first coupling bracket 18 through the reclining unit 40. As illustrated in FIG. 4, a second coupling bracket 19 is attached to an upper portion of a back end portion of the right cushion side frame 22. Moreover, the right side frame 12 is coupled with the second coupling bracket 19 through the reclining unit 40. Note that configurations of the first coupling bracket 18 and the second coupling bracket 19 is described below in detail.

2. Configuration of Side Frame 12

Figure 2:
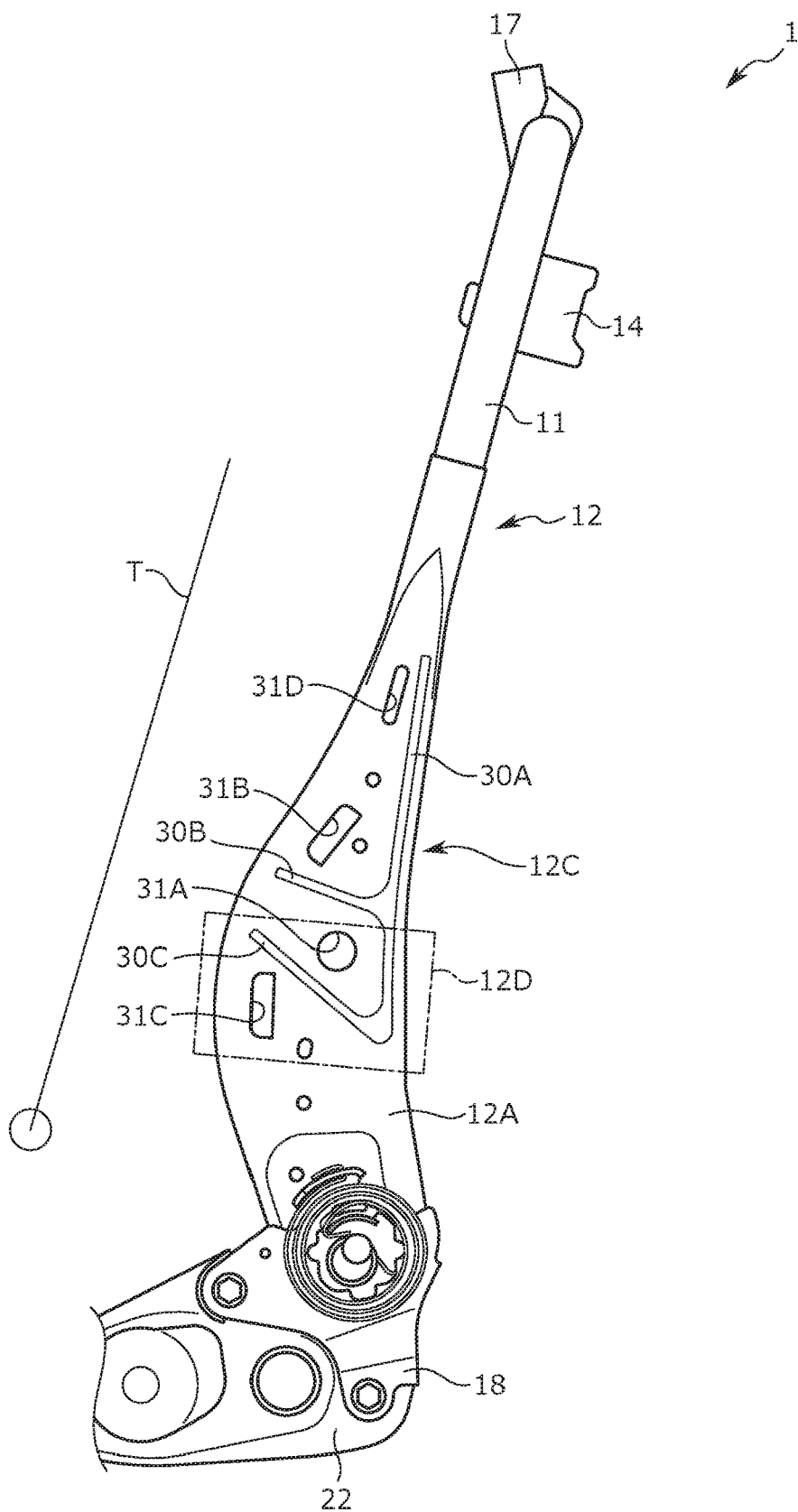
FIG. 2 is a left side view of a seat back frame.
Figure 3A:
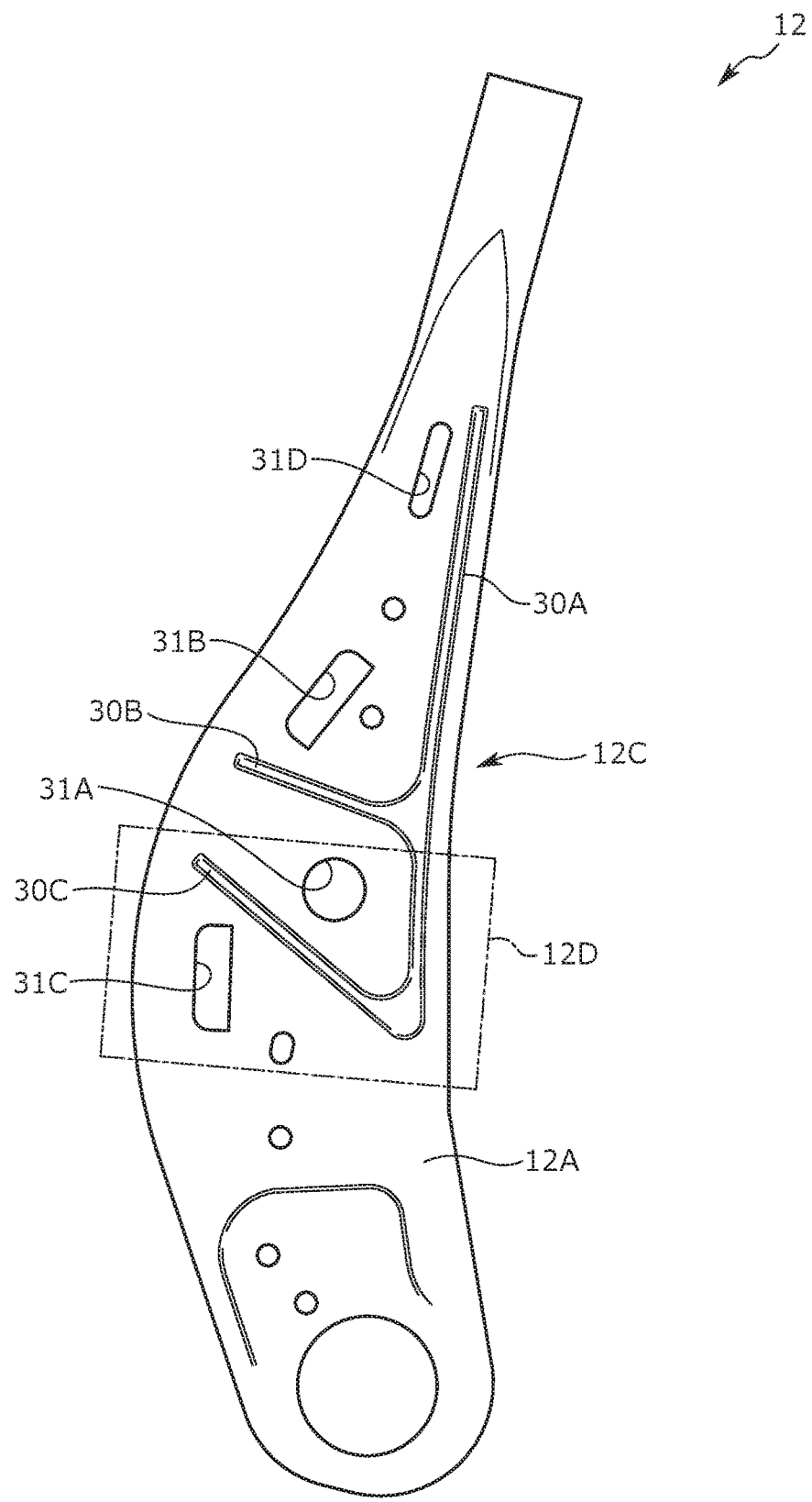
FIG. 3A is an outer view of a side frame.
Figure 3B:
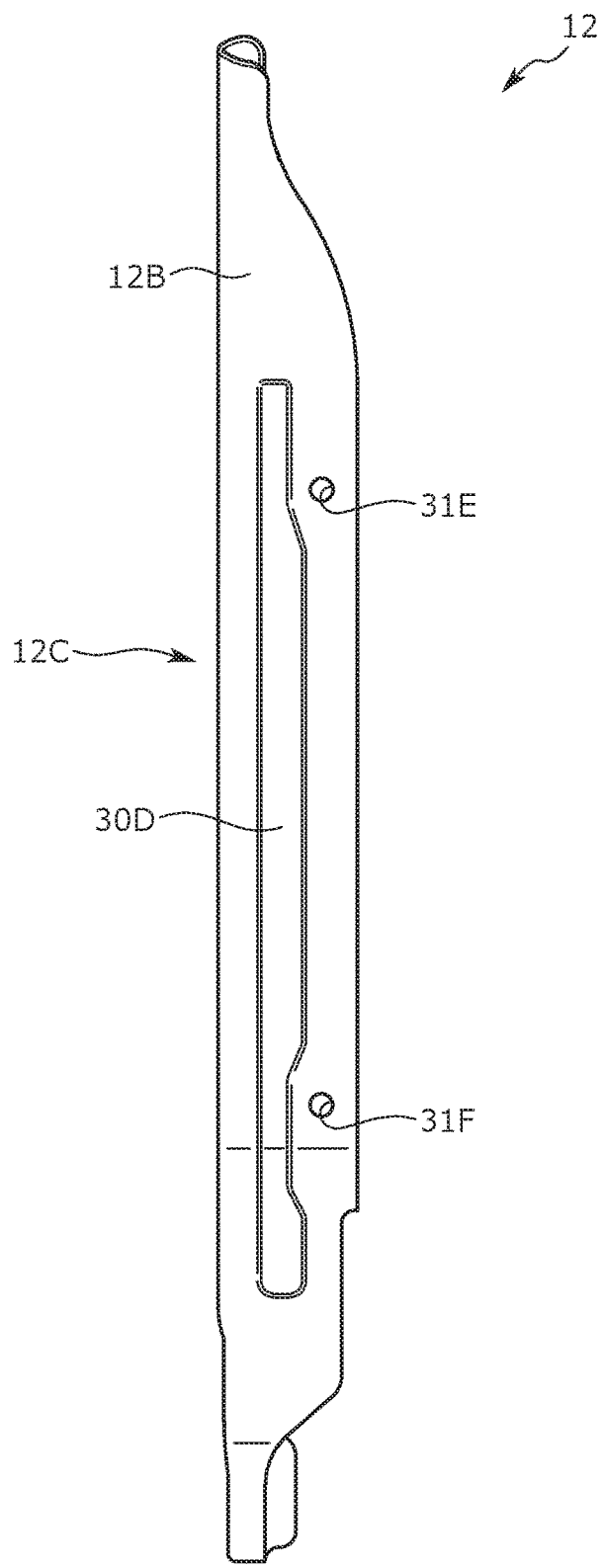
FIG. 3B is a back view of the side frame.

Next, a configuration of each side frame 12 is described with reference to FIGS. 2, 3A, 3B, and 3C. FIG. 2 is a left side view of the seat back frame 10. FIG. 3A is an outer view of the side frame 12, FIG. 3B is a back view of the side frame 12, and FIG. 3C is an inner view of the side frame 12.

Figure 3C:
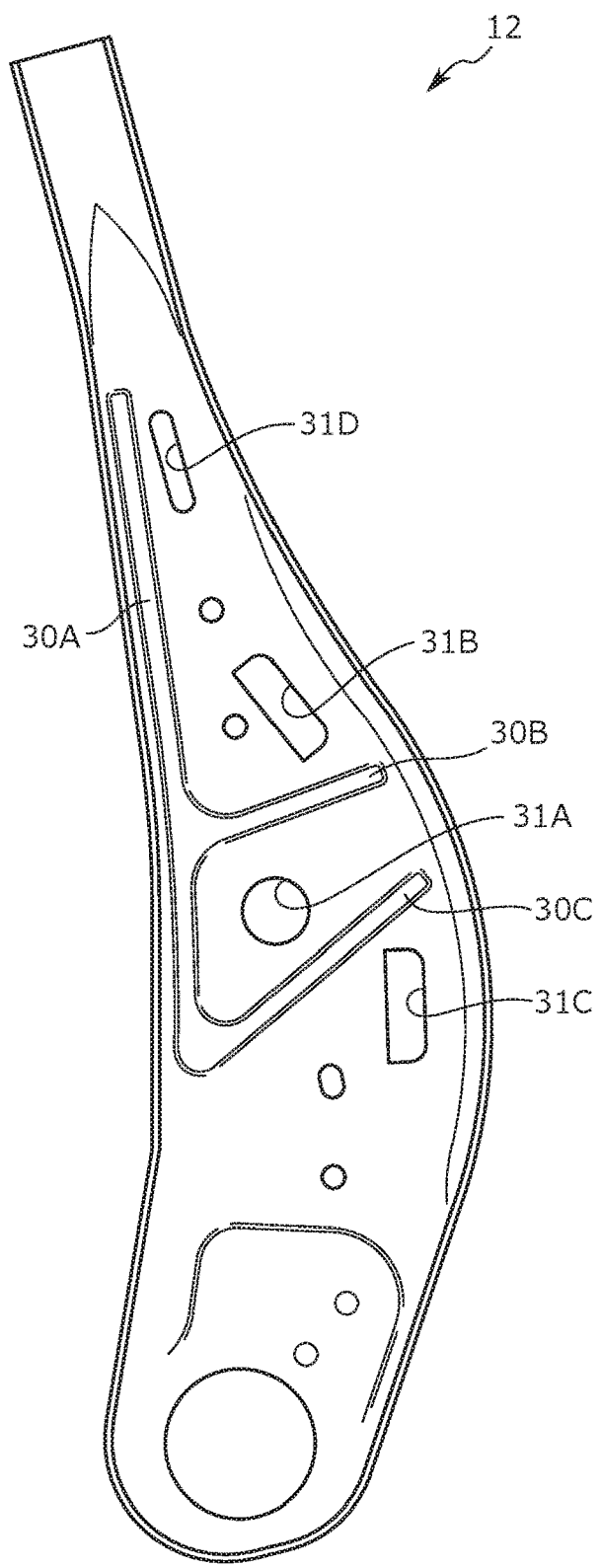
FIG. 3C is an inner view of the side frame.

As illustrated in FIGS. 2, 3A, and 3C, a plurality of through-holes including an airbag attachment hole 31A, an airbag attachment hole 31B, an airbag attachment hole 31C, and a through-hole 31D are formed at a side frame side portion 12A forming a side portion of the side frame 12. The airbag attachment hole 31A, the airbag attachment hole 31B, and the airbag attachment hole 31C are through-holes used for attachment of an airbag unit (not shown). The airbag unit described herein includes an airbag body, a webbing configured to guide a deployment direction of an air bag, a plate for airbag attachment, etc. For example, the airbag attachment hole 31B and the airbag attachment hole 31C are holes for attachment of the webbing of the airbag, and the airbag attachment hole 31A is a hole into which a bolt extending from a retainer of the airbag body is inserted. The through-hole 31D is formed at a position facing a lower end of the upper frame side portion 11A, and the side frame 12 and the upper frame 11 are welded together at the through-hole 31D.

As illustrated in FIGS. 2, 3A, and 3C, a first reinforcement portion 30A extending along a back edge 12C of the side frame 12 is formed at the side frame side portion 12A forming the side portion of the side frame 12. Note that the back edge 12C is a bent portion as a boundary between the side frame side portion 12A forming a side surface of the side frame 12 and a side frame back portion 12B forming a back surface of the side frame 12. The first reinforcement portion 30A is configured as a bead portion such that a portion of the side frame side portion 12A is recessed inward of the seat by pressing, for example. The first reinforcement portion 30A described herein is at least provided at a wide portion 12D having the greatest width at the side frame side portion 12A. In the present embodiment, the first reinforcement portion 30A is provided along the back edge 12C from a position facing the through-hole 31D to a position facing the airbag attachment hole 31C in the upper-to-lower direction. That is, the first reinforcement portion 30A is at least provided at such a position that the side frame 12 and the upper frame side portion 11A overlap with each other, and therefore, the strength of a joint portion between the side frame 12 and the upper frame 11 can be enhanced. Note that an upper end of the first reinforcement portion 30A may be positioned above the position of welding between the side frame 12 and the upper frame 11. Moreover, as illustrated in FIG. 2, the first reinforcement portion 30A is, as viewed laterally, provided at a position overlapping with the upper frame 11 and the cushion side frame 22 in the upper-to-lower direction.

As illustrated in FIGS. 2, 3A, and 3C, a second reinforcement portion 30B extending in front of the seat from an intermediate position between upper and lower ends of the first reinforcement portion 30A is provided at the side frame side portion 12A forming the side portion of the side frame 12. The second reinforcement portion 30B is, as in the first reinforcement portion 30A, configured as a bead portion such that a portion of the side frame side portion 12A is recessed inward of the seat by pressing. The second reinforcement portion 30B described herein is formed between the airbag attachment hole 31A and the airbag attachment hole 31B. Note that a back end of the second reinforcement portion 30B is connected to the first reinforcement portion 30A such that both of these portions are integrated together. Moreover, a front end of the second reinforcement portion 30B is positioned in front of the seat with respect to the airbag attachment hole 31B, and is positioned behind the seat with respect to a front edge of the side frame side portion 12A.

As illustrated in FIGS. 2, 3A, and 3C, a third reinforcement portion 30C extending in front of the seat from the lower end of the first reinforcement portion 30A is formed at the side frame side portion 12A forming the side portion of the side frame 12. The third reinforcement portion 30C is, as in the first reinforcement portion 30A, configured as a bead portion such that a portion of the side frame side portion 12A is recessed inward of the seat by pressing. The third reinforcement portion 30C described herein is formed between the airbag attachment hole 31A and the airbag attachment hole 31C. Note that a back end of the third reinforcement portion 30C is connected to the first reinforcement portion 30A such that both of these portions are integrated together. Moreover, a front end of the third reinforcement portion 30C is positioned in front of the seat with respect to the airbag attachment hole 31C, and is positioned behind the seat with respect to the front edge of the side frame side portion 12A.

As illustrated in FIG. 2, the second reinforcement portion 30B extends from the first reinforcement portion 30A at such an angle (i.e., the substantially right angle) that the second reinforcement portion 30B is substantially perpendicular to a torso line T corresponding to the axis of the body of a three-dimensional mannequin representing the occupant seated on the vehicle seat having the seat frame 1 as the framework. The third reinforcement portion 30C extends from the first reinforcement portion 30A at such an angle (i.e., a sharp angle) that the third reinforcement portion 30C is not perpendicular to the torso line T. That is, the second reinforcement portion 30B and the third reinforcement portion 30C are different from each other in the angle of extending from the first reinforcement portion 30A. As described above, the extension angles of the first reinforcement portion 30A, the second reinforcement portion 30B, and the third reinforcement portion 30C are differentiated from each other so that stiffness against load input from various directions can be enhanced. Moreover, the first reinforcement portion 30A, the second reinforcement portion 30B, and the third reinforcement portion 30C are each provided above the reclining unit 40 in the upper-to-lower direction.

Further, bottom portions (i.e., bottom portions of the beads) of the first reinforcement portion 30A, the second reinforcement portion 30B, and the third reinforcement portion 30C on the inside of the seat are positioned on the outside of the seat with respect to an end portion of a flange provided at a front portion of the side frame 12. In addition, an upper end portion of the first reinforcement portion 30A may have a narrower width than that of a lower end portion. Moreover, front end portions of the second reinforcement portion 30B and the third reinforcement portion 30C may have narrower widths than those of back portions. Further, the front end portions of the second reinforcement portion 30B and the third reinforcement portion 30C may be positioned in front of the front wall portion 13B of the lower frame 13, the support portion 15A of the pressure receiving member 15, an attachment portion of the reclining unit 40, the headrest attachment portion 17, and the rotary shaft 16. In addition, any of the first reinforcement portion 30A, the second reinforcement portion 30B, and the third reinforcement portion 30C may be positioned in front of the headrest attachment portion 17.

As illustrated in FIG. 3B, a back reinforcement portion 30D is formed at a center portion of the side frame back portion 12B of the side frame 12. A through-hole 31E and a through-hole 31F are each formed at upper and lower portions of the side frame back portion 12B. The back reinforcement portion 30D is configured as a bead portion such that a portion of the side frame back portion 12B is recessed inward of the seat by pressing. The back reinforcement portion 30D extends from a position facing the upper end of the first reinforcement portion 30A to a position below the lower end of the first reinforcement portion 30A. Moreover, the back reinforcement portion 30D is formed such that an upper end of the back reinforcement portion 30D is positioned above the through-hole 31E formed at the side frame back portion 12B and that a lower end of the back reinforcement portion 30D is positioned below the through-hole 31F formed at the side frame back portion 12B. A center portion of the back reinforcement portion 30D positioned between the through-hole 31E and the through-hole 31F is configured as a wide portion having a larger width than those portions of the upper and lower ends of the back reinforcement portion 30D. Moreover, the lower end of the back reinforcement portion 30D is at a position overlapping with the lower frame 13 in the upper-to-lower direction. As described above, the back reinforcement portion 30D is formed at the side frame back portion 12B so that strength can be enhanced across a wide area of the side frame back portion 12B.

As described above, an inverted F-shaped bead portion configured such that the first reinforcement portion 30A, the second reinforcement portion 30B, and the third reinforcement portion 30C are integrally formed is provided at the side frame side portion 12A of the side frame 12, and therefore, strength across a wide area of the side frame side portion 12A can be improved with favorable balance. Moreover, the first reinforcement portion 30A is provided along the back edge 12C so that the strength of the back edge 12C can be enhanced. Further, the first reinforcement portion 30A is at least provided at the wide portion 12D of the side frame side portion 12A, and therefore, the strength of the wide portion 12D can be enhanced even in a case where various through-holes for attachment of a component such as the airbag are formed at the wide portion 12D. In addition, the second reinforcement portion 30B and the third reinforcement portion 30C are formed at such positions that the second reinforcement portion 30B and the third reinforcement portion 30C sandwich the airbag attachment hole 31A in the upper-to-lower direction, and therefore, the strength of the periphery of the airbag attachment hole 31A can be enhanced. Moreover, the second reinforcement portion 30B is provided between the airbag attachment hole 31A and the airbag attachment hole 31B, and therefore, the strength of the peripheries of the airbag attachment hole 31A and the airbag attachment hole 31B can be enhanced. Further, the third reinforcement portion 30C is provided between the airbag attachment hole 31A and the airbag attachment hole 31C, and therefore, the strength of the peripheries of the airbag attachment hole 31A and the airbag attachment hole 31C can be enhanced.

3. Configurations of First Coupling Bracket 18 and Second Coupling Bracket 19

Next, the configurations of the first coupling bracket 18 and the second coupling bracket 19 is described with reference to FIGS. 1, 4, and 6C.

Figure 5A:
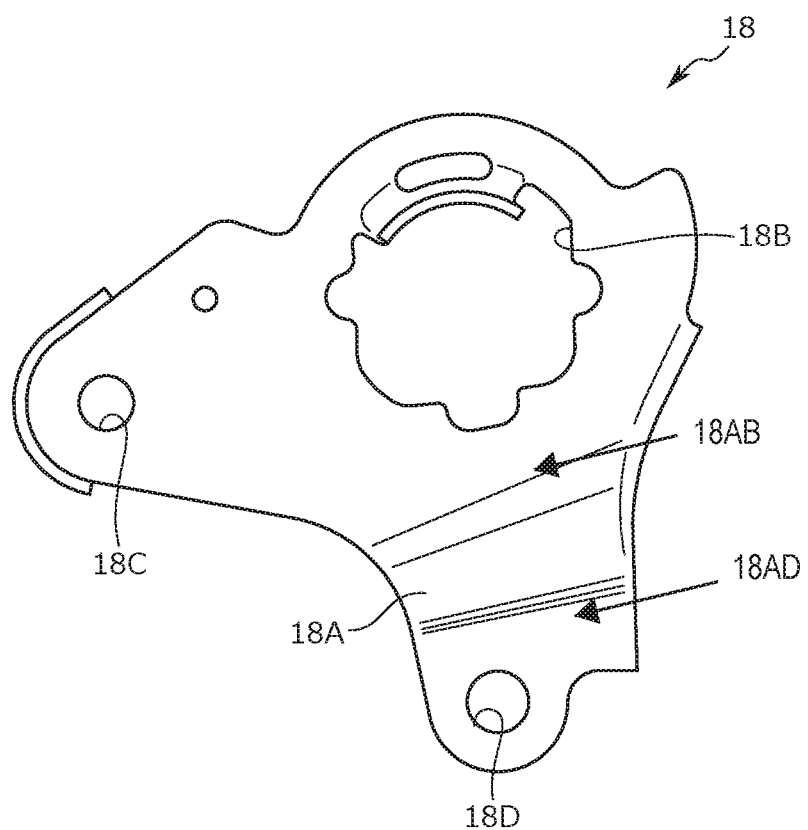
FIG. 5A is an outer view of a first coupling bracket.
Figure 5B:
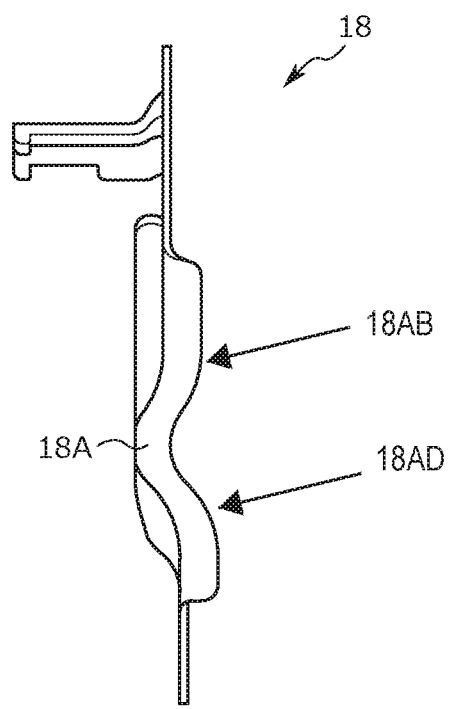
FIG. 5B is a back view of the first coupling bracket.
Figure 5C:
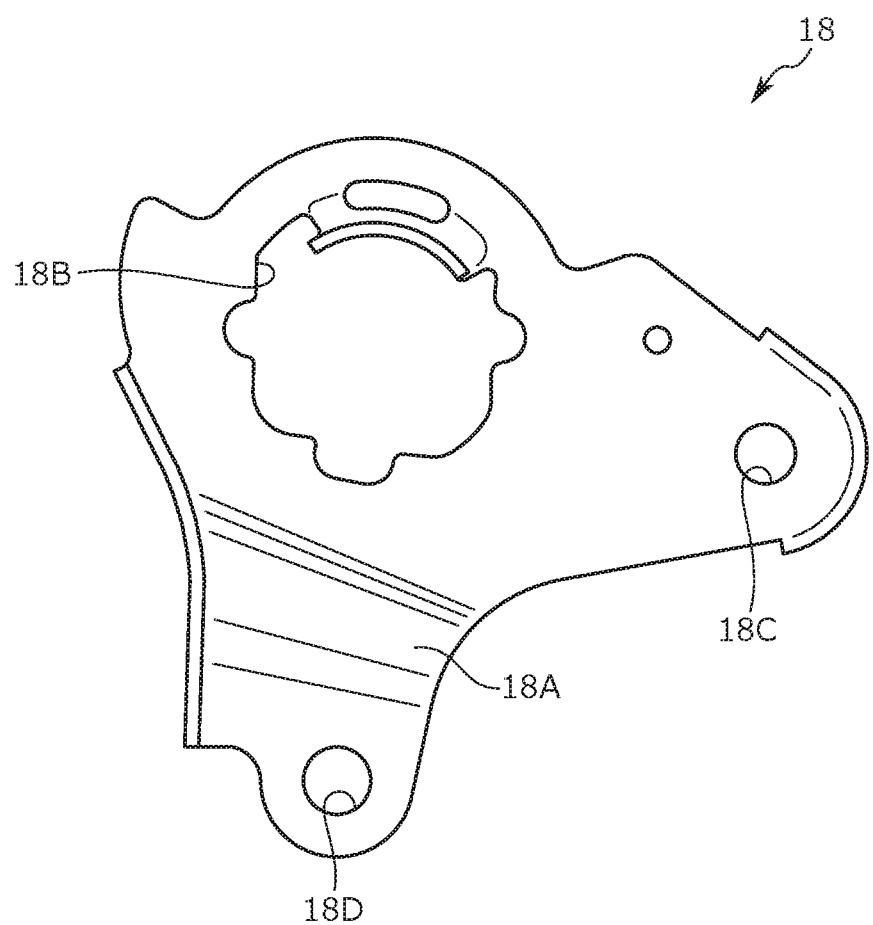
FIG. 5C is an inner view of the first coupling bracket.

FIG. 4 is a partial enlarged view of the periphery of the second coupling bracket 19 from a view point IV of FIG. 1. FIGS. 5A, 5B, and 5C each correspond to an outer view, a back view, and an inner view, respectively, of the first coupling bracket 18. Moreover, FIGS. 6A, 6B, and 6C each correspond to an outer view, a back view, and an inner view, respectively, of the second coupling bracket 19.

As illustrated in FIGS. 5A, 5B, and 5C, a weak portion 18A, a shaft through-hole 18B, a bolt fastening hole 18C, and a bolt fastening hole 18D are provided at the first coupling bracket 18. The weak portion 18A is a portion provided between the shaft through-hole 18B and the bolt fastening hole 18D and bent outward from the seat. In a case where a load is input to the first coupling bracket 18, the weak portion 18A easily deforms. The rotary shaft 16 is inserted into the shaft through-hole 18B, and the left reclining unit 40 is attached to the shaft through-hole 18B. The left side frame 12 is coupled with the first coupling bracket 18 through the left reclining unit 40. The left cushion side frame 22 is fixed to the bolt fastening hole 18C and the bolt fastening hole 18D through fastening tools such as bolts and nuts. For example, upon back collision of the vehicle, the weak portion 18A of the first coupling bracket 18 deforms to absorb impact.

Figure 6A:
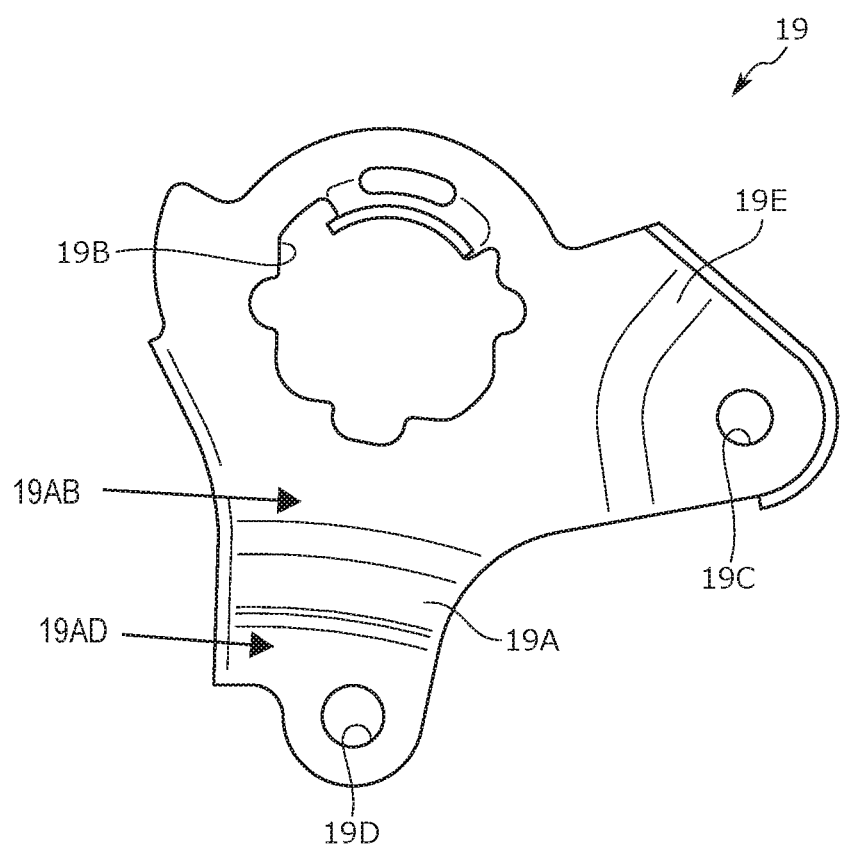
FIG. 6A is an outer view of the second coupling bracket.
Figure 6B:
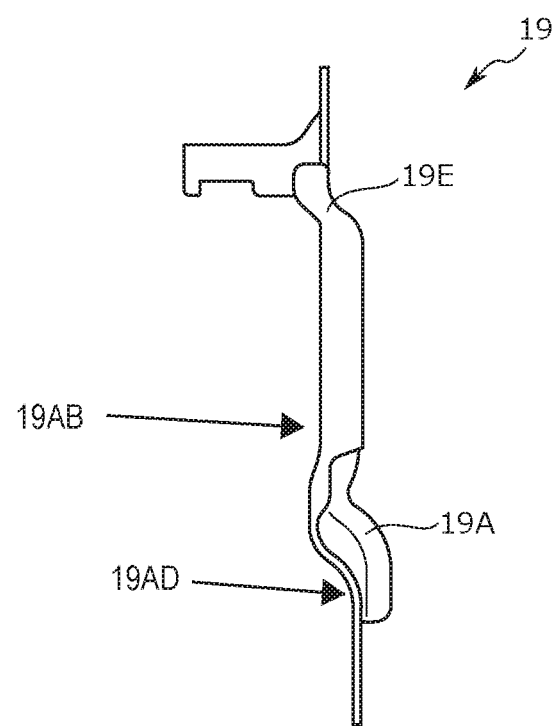
FIG. 6B is a back view of the second coupling bracket.
Figure 6C:
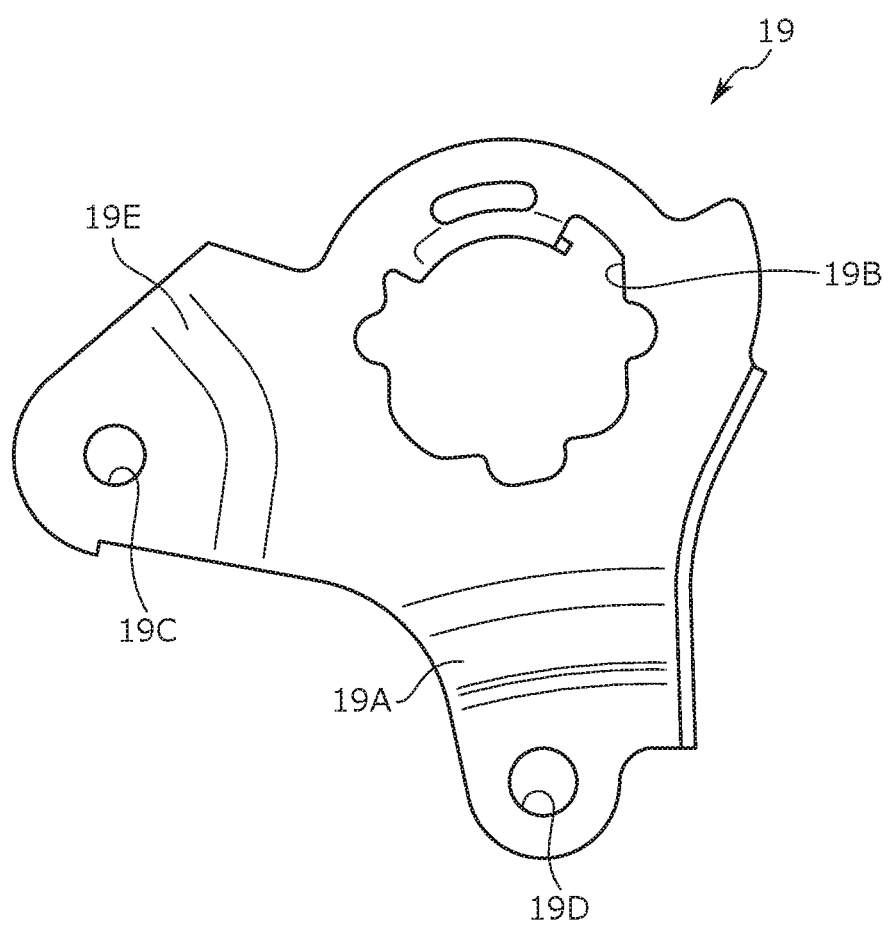
FIG. 6C is an inner view of the second coupling bracket.

As illustrated in FIGS. 6A, 6B, and 6C, a weak portion 19A, a shaft through-hole 19B, a bolt fastening hole 19C, a bolt fastening hole 19D, and a weak portion 19E are provided at the second coupling bracket 19. The weak portion 19A is a portion provided between the shaft through-hole 19B and the bolt fastening hole 19D and bent outward from the seat. In a case where a load is input to the second coupling bracket 19, the weak portion 19A easily deforms. The rotary shaft 16 is inserted into the shaft through-hole 19B, and the right reclining unit 40 is attached to the shaft through-hole 19B. The right side frame 12 is coupled with the second coupling bracket 19 through the right reclining unit 40. The right cushion side frame 22 is fixed to the bolt fastening hole 19C and the bolt fastening hole 19D through fastening tools such as bolts and nuts. Moreover, the weak portion 19E is a portion provided between the shaft through-hole 19B and the bolt fastening hole 19C and bent outward from the seat. In a case where a load is input to the second coupling bracket 19, the weak portion 19E easily deforms. For example, upon back collision of the vehicle, the weak portion 19A and the weak portion 19E of the second coupling bracket 19 deform to absorb impact.

Note that regarding the weak portion 18A of the first coupling bracket 18, a first connection part 18AB on a shaft through-hole 18B side and a second connection part 18AD on a bolt fastening hole 18D side are at the substantially same position in the seat width direction. That is, in the first coupling bracket 18, the first connection part 18AB and the second connection part 18AD are not offset from each other in the seat width direction. On the other hand, regarding the weak portion 19A of the second coupling bracket 19, a second connection part 19AD on a bolt fastening hole 19D side is positioned inward of the seat in the seat width direction with respect to a first connection part 19AB on a shaft through-hole 19B side. That is, in the second coupling bracket 19, the first connection part 19AB and the second connection part 19AD are offset from each other in the seat width direction. Moreover, in the first coupling bracket 18, no weak portion is provided between the shaft through-hole 18B and the bolt fastening hole 18C. On the other hand, in the second coupling bracket 19, the weak portion 19E is provided between the shaft through-hole 19B and the bolt fastening hole 19C. As described above, the weak portions are provided in an asymmetric manner between the first coupling bracket 18 and the second coupling bracket 19, and therefore, deformability in a case where a load is input to the seat frame 1 is differentiated.

As illustrated in FIG. 1, a height adjustment unit 41 is provided at the left cushion side frame 22, and no similar component is provided at the right cushion side frame 22. Thus, a greater load is, upon back collusion, input to the first coupling bracket 18 coupled with the left cushion side frame 22 than to the second coupling bracket 19 coupled with the right cushion side frame 22. In the seat frame 1, the weak portions are asymmetrically provided at the first coupling bracket 18 and the second coupling bracket 19 as described above such that the second coupling bracket 19 becomes more easily deformable than the first coupling bracket 18. Thus, adjustment can be made such that the degree of deformation is the substantially same between the first coupling bracket 18 and the second coupling bracket 19.

4. Configuration of Lower Frame 13

Figure 7:
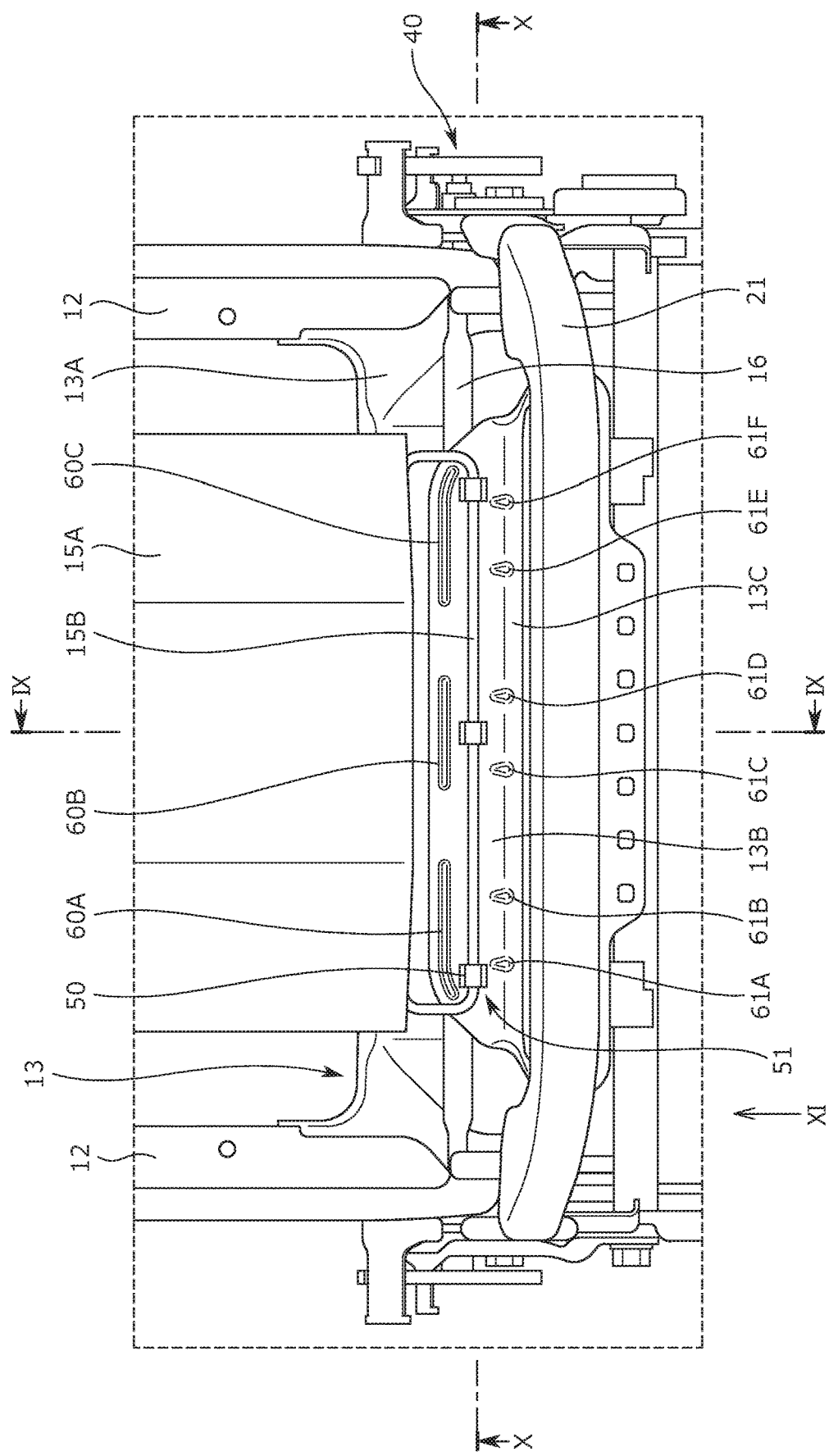
FIG. 7 is a partial enlarged view of a front side of the seat frame.
Figure 8:
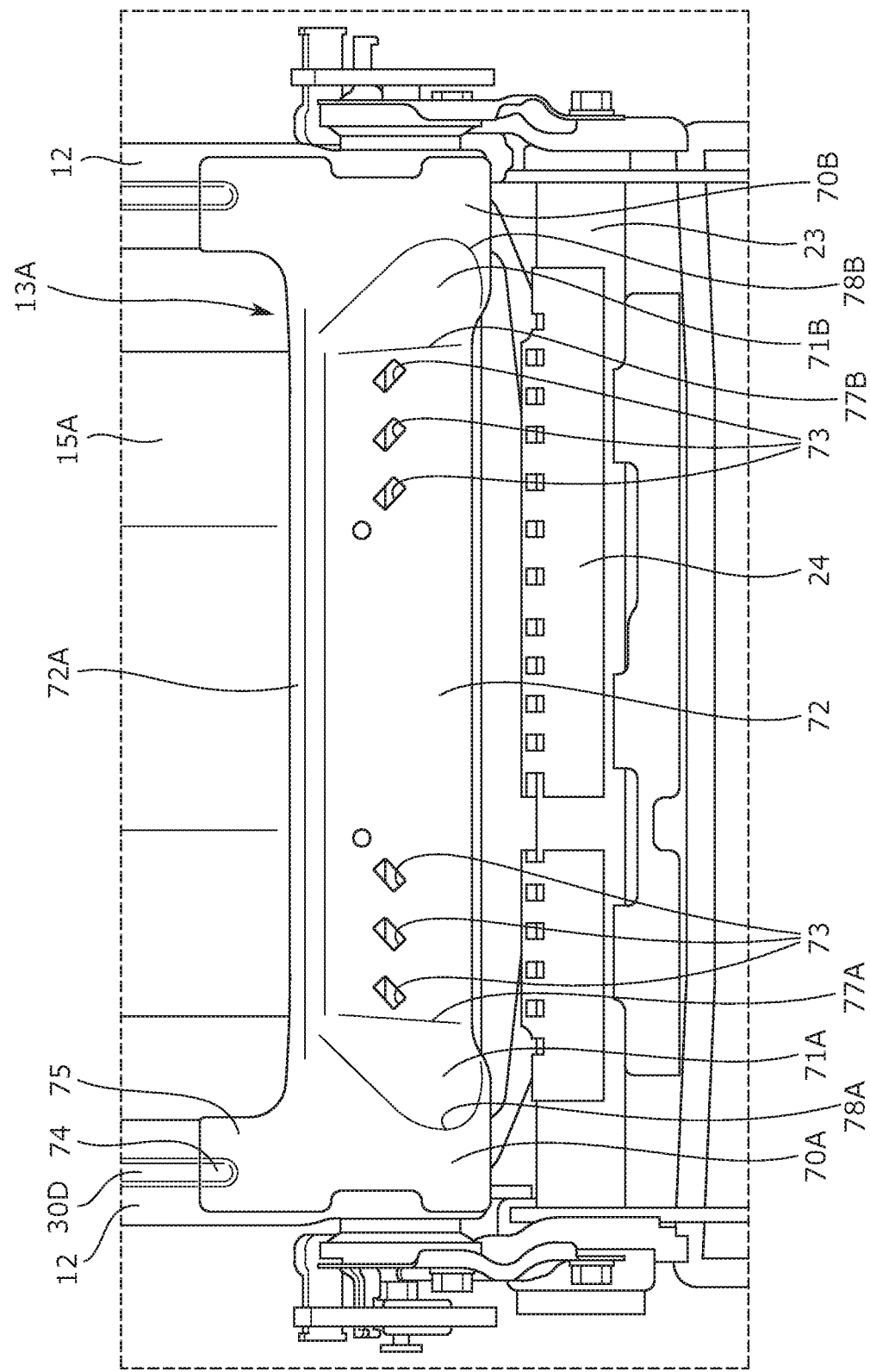
FIG. 8 is a partial enlarged view of a back side of the seat frame.
Figure 9:
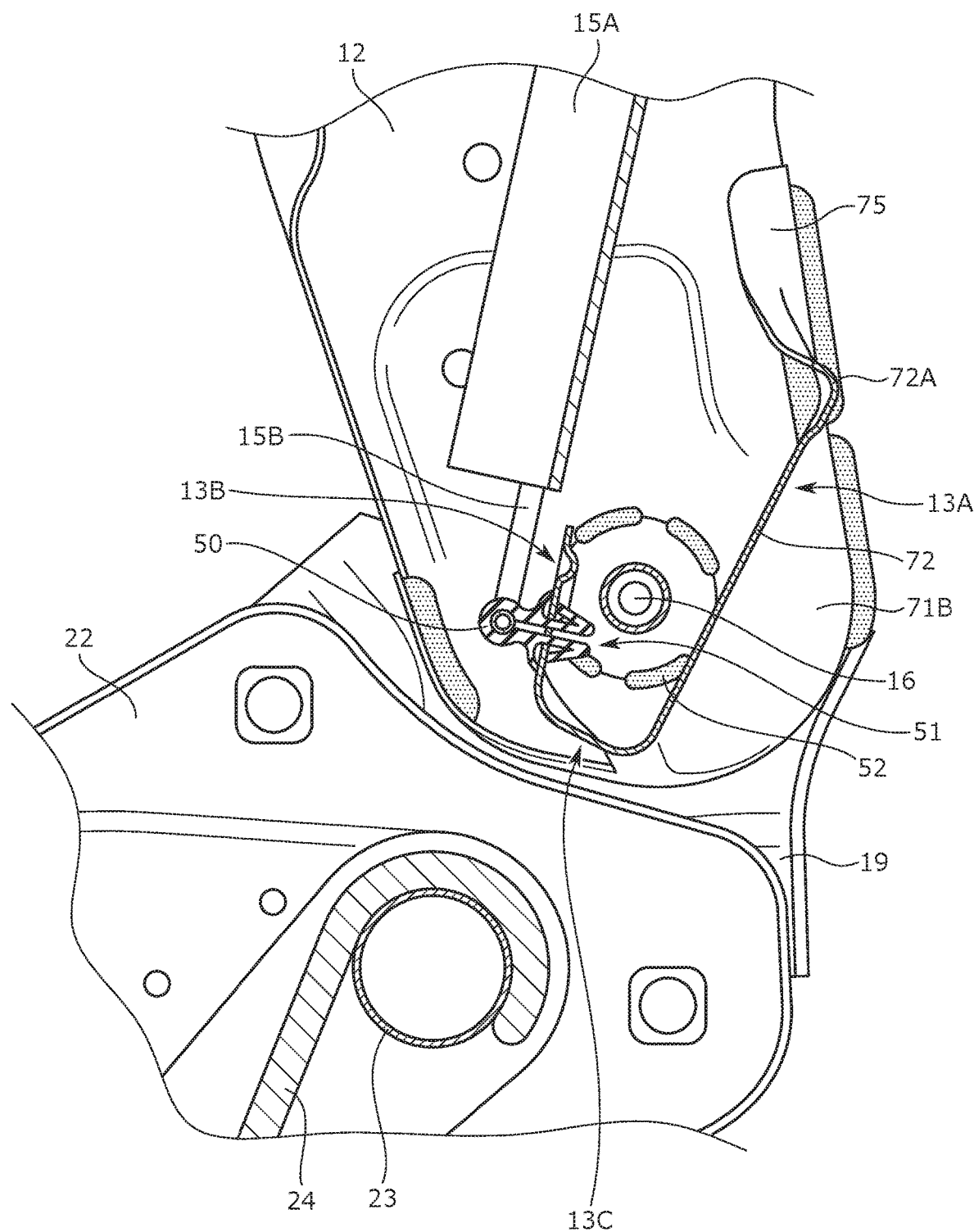
FIG. 9 is a cross-sectional view along a IX-IX line of FIG. 7.
Figure 10:
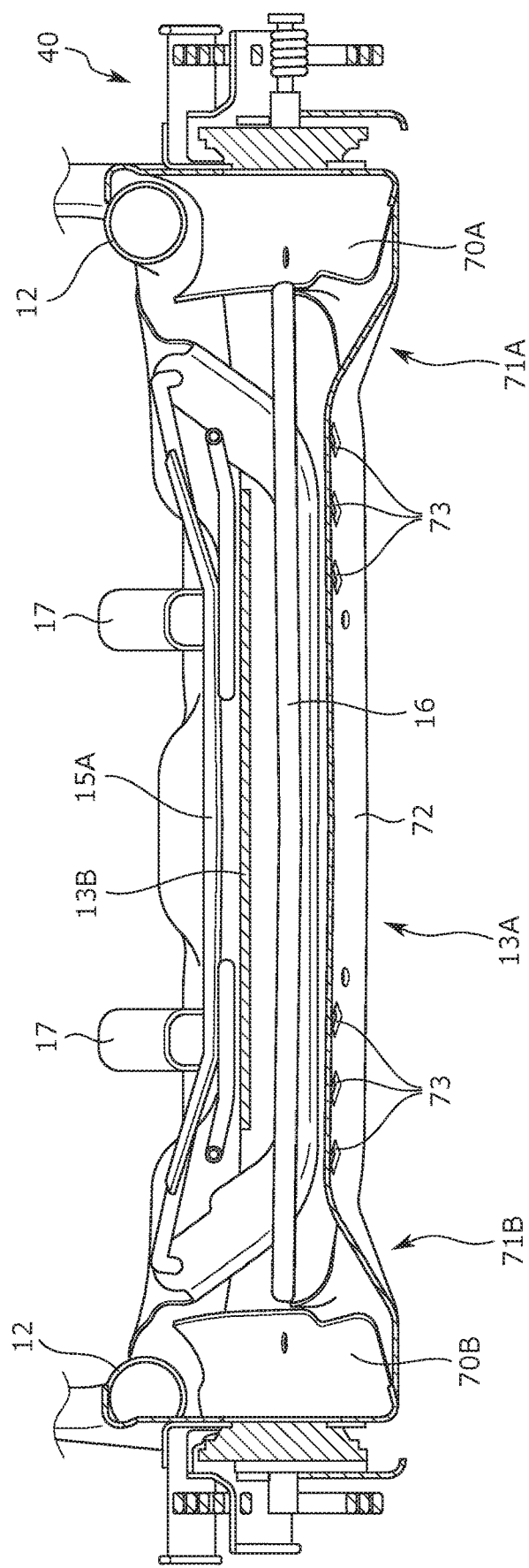
FIG. 10 is a cross-sectional view along a X-X line of FIG. 7.
Figure 11:
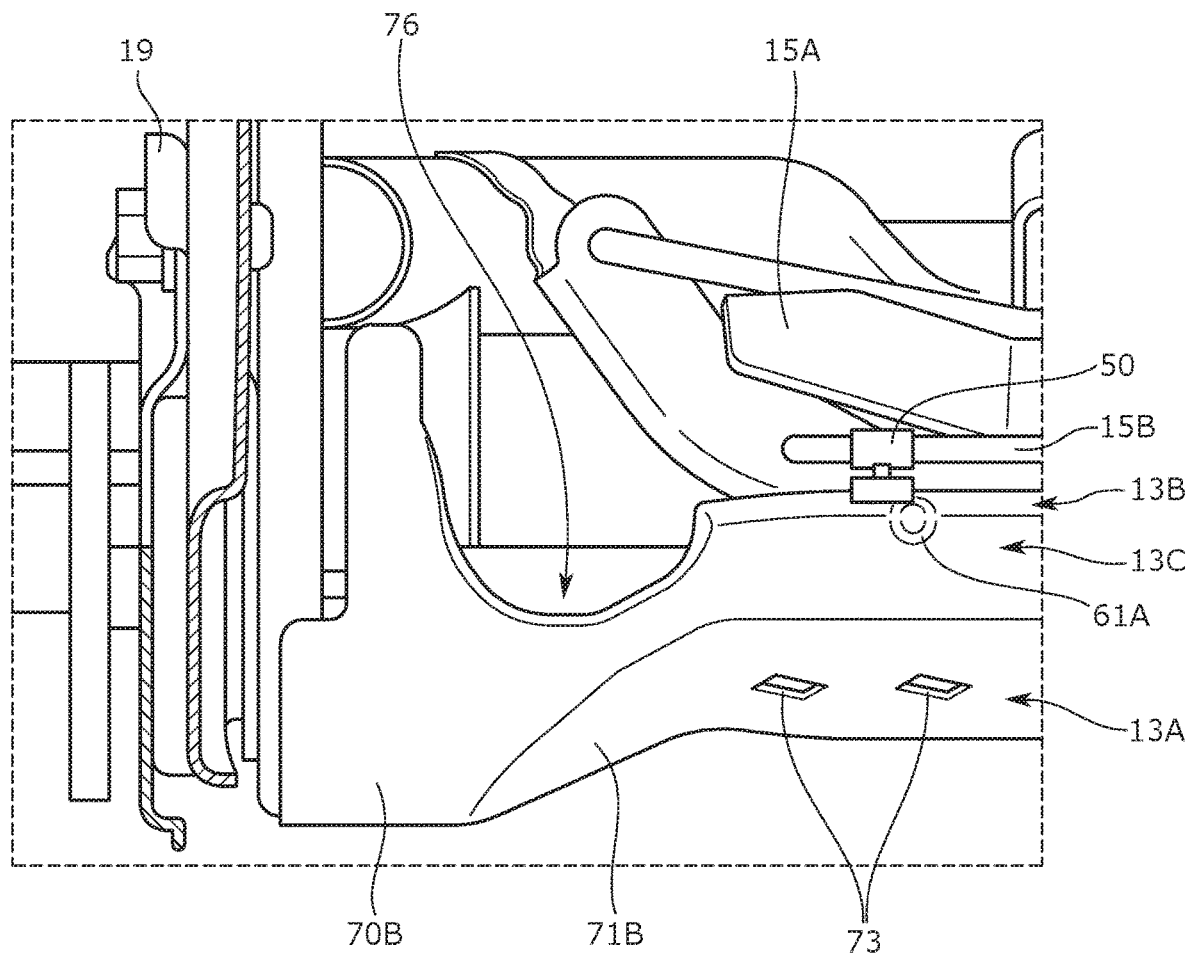
FIG. 11 is a partial enlarged view from a view point XI of FIG. 7.

Next, a configuration of the lower frame 13 is described with reference to FIGS. 7 to 11. FIG. 7 is a front view of the seat frame 1, FIG. 7 being also a partial enlarged view of the periphery of the lower frame 13. FIG. 8 is a back view of the seat frame 1, FIG. 8 being also a partial enlarged view of the periphery of the lower frame 13. FIG. 9 is a cross-sectional view along a IX-IX line of FIG. 7, and FIG. 10 is a cross-sectional view along a X-X line of FIG. 7. FIG. 11 is a view from an arrow of a view point XI of FIG. 7, FIG. 11 being also a partial enlarged view of the periphery of a recessed portion 76 of the lower frame 13.

As illustrated in FIGS. 7 to 9, the lower frame 13 includes a back wall portion 13A forming a back portion of the seat, the front wall portion 13B forming a front portion of the seat, and a coupling portion 13C coupling lower ends of the back wall portion 13A and the front wall portion 13B.

4.1. Configuration of Front Wall Portion 13B of Lower Frame 13

First, a configuration of the front wall portion 13B of the lower frame 13 is mainly described. As illustrated in FIGS. 7 and 9, the front wall portion 13B is a portion extending in the seat width direction, the portion facing the support portion 15A and extending upward from the coupling portion 13C. As illustrated in FIG. 7, the wire 15B to which the three clips 50 are attached is attached to a lower end of the support portion 15A. Moreover, three attachment portions 51 as through-holes in which the clips 50 are fitted are formed at the front wall portion 13B. As illustrated in FIG. 7, the attachment portions 51 are provided apart from the support portion 15A below the support portion 15A. Moreover, the attachment portions 51 are provided on the inside of ends of the support portion 15A in the right-to-left direction. The clips 50 attached to the wire 15B are fitted in the attachment portions 51 of the front wall portion 13B, and in this manner, the wire 15B is fixed to the front wall portion 13B.

As illustrated in FIG. 7, an upper reinforcement portion 60A, an upper reinforcement portion 60B, and an upper reinforcement portion 60C, each extending in the seat width direction, are formed above the attachment portions 51 for each clip 50 at the front wall portion 13B. As illustrated in FIG. 7, the upper reinforcement portion 60A, the upper reinforcement portion 60B, and the upper reinforcement portion 60C are formed on the substantially same horizontal plane. The upper reinforcement portion 60A is provided on the left side, the upper reinforcement portion 60B is provided at the center, and the upper reinforcement portion 60C is provided at the right side. Note that each of the upper reinforcement portion 60A, the upper reinforcement portion 60B, and the upper reinforcement portion 60C is formed as a bead portion such that a portion of the front wall portion 13B is recessed backward from the seat by pressing.

As illustrated in FIG. 7, each of the upper reinforcement portion 60A, the upper reinforcement portion 60B, and the upper reinforcement portion 60C is formed in a shape along an upper edge of the front wall portion 13B. That is, the upper edge of the front wall portion 13B is in a straight shape at the center, and is in an arc shape at right and left end portions. Accordingly, a left end portion of the upper reinforcement portion 60A is in an arc shape, and other portions of the upper reinforcement portion 60A are in a straight shape; the upper reinforcement portion 60B is in a straight shape; and a right end portion of the upper reinforcement portion 60C is in an arc shape, and other portions of the upper reinforcement portion 60C are in a straight shape. Moreover, the position of the left end portion of the upper reinforcement portion 60A is on the outside of the opposing attachment portion 51 in the seat width direction. Similarly, the position of the right end portion of the upper reinforcement portion 60C is on the outside of the opposing attachment portion 51 in the seat width direction.

As illustrated in FIG. 7, a lower reinforcement portion 61A and a lower reinforcement portion 61B separated from each other are formed below the attachment portion 51 facing the upper reinforcement portion 60A at a boundary portion between the front wall portion 13B and the coupling portion 13C. Each of the lower reinforcement portion 61A and the lower reinforcement portion 61B is formed as a bead portion such that the boundary portion between the front wall portion 13B and the coupling portion 13C is recessed backward from the seat by pressing. As illustrated in FIG. 7, the attachment portion 51 facing the upper reinforcement portion 60A is, in the seat upper-to-lower direction, provided between the upper reinforcement portion 60A and each of the lower reinforcement portion 61A and the lower reinforcement portion 61B. Moreover, the position of the left end portion of the upper reinforcement portion 60A is on the outside of the lower reinforcement portion 61A in the seat width direction. Moreover, the position of a right end portion of the upper reinforcement portion 60A is on the inside of the lower reinforcement portion 61B in the seat width direction. That is, the lower reinforcement portion 61A and the lower reinforcement portion 61B are formed on the inside in the seat width direction with respect to the upper reinforcement portion 60A provided on the upper side. Moreover, a spacing interval between the lower reinforcement portion 61A and the lower reinforcement portion 61B is shorter than the length of the upper reinforcement portion 60A in the width direction.

As illustrated in FIG. 7, a lower reinforcement portion 61C and a lower reinforcement portion 61D separated from each other are formed below the attachment portion 51 facing the upper reinforcement portion 60B at the boundary portion between the front wall portion 13B and the coupling portion 13C. Each of the lower reinforcement portion 61C and the lower reinforcement portion 61D is formed as a bead portion such that the boundary portion between the front wall portion 13B and the coupling portion 13C is recessed backward from the seat by pressing. As illustrated in FIG. 7, the attachment portion 51 facing the upper reinforcement portion 60B is, in the seat upper-to-lower direction, provided between the upper reinforcement portion 60B and each of the lower reinforcement portion 61C and the lower reinforcement portion 61D. Moreover, the attachment portion 51 facing the upper reinforcement portion 60B is, in the seat width direction, provided between the lower reinforcement portion 61C and the lower reinforcement portion 61D. Further, the position of a left end portion of the upper reinforcement portion 60B is on the outside of the lower reinforcement portion 61C in the seat width direction. In addition, the position of a right end portion of the upper reinforcement portion 60B is on the outside of the lower reinforcement portion 61D in the seat width direction. That is, the lower reinforcement portion 61C and the lower reinforcement portion 61D are formed on the inside in the seat width direction with respect to the upper reinforcement portion 60B provided on the upper side. Moreover, a spacing interval between the lower reinforcement portion 61C and the lower reinforcement portion 61D is shorter than the length of the upper reinforcement portion 60B in the width direction.

As illustrated in FIG. 7, a lower reinforcement portion 61E and a lower reinforcement portion 61F separated from each other are formed below the attachment portion 51 facing the upper reinforcement portion 60C at the boundary portion between the front wall portion 13B and the coupling portion 13C. Each of the lower reinforcement portion 61E and the lower reinforcement portion 61F is formed as a bead portion such that the boundary portion between the front wall portion 13B and the coupling portion 13C is recessed backward from the seat by pressing. As illustrated in FIG. 7, the attachment portion 51 facing the upper reinforcement portion 60C is, in the seat upper-to-lower direction, provided between the upper reinforcement portion 60C and each of the lower reinforcement portion 61E and the lower reinforcement portion 61F. Moreover, the position of a left end portion of the upper reinforcement portion 60C is on the inside of the lower reinforcement portion 61E in the seat width direction. In addition, the position of the right end portion of the upper reinforcement portion 60C is on the outside of the lower reinforcement portion 61F in the seat width direction. That is, the lower reinforcement portion 61E and the lower reinforcement portion 61F are formed on the inside in the seat width direction with respect to the upper reinforcement portion 60C provided on the upper side. Moreover, a spacing interval between the lower reinforcement portion 61E and the lower reinforcement portion 61F is shorter than the length of the upper reinforcement portion 60C in the width direction.

Moreover, as illustrated in FIG. 7, a spacing interval between the upper reinforcement portion 60A and the upper reinforcement portion 60B adjacent to each other on the upper side is shorter than a spacing interval between the lower reinforcement portion 61B and the lower reinforcement portion 61C adjacent to each other on the lower side. Similarly, a spacing interval between the upper reinforcement portion 60B and the upper reinforcement portion 60C adjacent to each other on the upper side is shorter than a spacing interval between the lower reinforcement portion 61D and the lower reinforcement portion 61E adjacent to each other on the lower side.

For example, in a case where the pressure receiving member 15 is attached to a front surface of the back wall portion 13A, the rotary shaft 16 is provided between the back wall portion 13A and the front wall portion 13B, and a suitably sufficient space is not provided. For this reason, the process of attaching the pressure receiving member 15 is more difficult. The attachment portions 51 to which the wire 15B of the pressure receiving member 15 is attached are provided at the front wall portion 13B of the lower frame 13 in the seat frame 1, and therefore, the rotary shaft 16 and an engineer's hand do not contact each other. Thus, workability in attachment of the pressure receiving member 15 can be improved.

4.2. Configuration of Back Wall Portion 13A of Lower Frame 13

Next, a configuration of the back wall portion 13A of the lower frame 13 is mainly described. As illustrated in FIG. 8, the back wall portion 13A has a side portion 70A, a side portion 70B, a connection portion 71A, a connection portion 71B, and an inclined portion 72. The side portion 70A and the side portion 70B each form ends in the seat width direction, and are each formed in shapes along the outer shapes of the side frames 12.

As illustrated in FIGS. 8 and 9, the inclined portion 72 is provided between the side portion 70A and the side portion 70B, and is inclined such that a lower end is positioned in front of an upper end. Moreover, the inclined portion 72 is positioned in front of the seat with respect to the side portion 70A and the side portion 70B. The connection portion 71A is a substantially semicircular portion connecting between the side portion 70A and the inclined portion 72. Moreover, the connection portion 71A is inclined outward in the seat width direction. Specifically, the connection portion 71A includes an inner portion 77A configured to connect the inclined portion 72 and the connection portion 71A, and an outer portion 78A configured to connect the side portion 70A and the connection portion 71A. Moreover, the inner portion 77A is positioned in front of the outer portion 78A. The connection portion 71B is a substantially semicircular portion connecting between the side portion 70B and the inclined portion 72. Moreover, the connection portion 71B is inclined outward in the seat width direction. Specifically, the connection portion 71B includes an inner portion 77B configured to connect the inclined portion 72 and the connection portion 71B, and an outer portion 78B configured to connect the side portion 70B and the connection portion 71B. Moreover, the inner portion 77B is positioned in front of the outer portion 78B.

As illustrated in FIG. 8, a reinforcement portion 72A is provided at an upper edge of the inclined portion 72. The reinforcement portion 72A is a flange portion protruding behind the seat. Since the reinforcement portion 72A is provided at the inclined portion 72 as described above, the strength of the upper edge of the inclined portion 72 can be improved. Moreover, as illustrated in FIG. 8, ends of the inclined portion 72 in the seat width direction are positioned on the outside of the ends of the support portion 15A in the seat width direction.

As illustrated in FIG. 8, a plurality of through-holes 73 is formed on the same horizontal plane at the inclined portion 72. Specifically, the plurality (three) of through-holes 73 are formed at substantially equal spacing intervals on the left side of the inclined portion 72 in the seat width direction, and the plurality (three) of through-holes 73 are formed at substantially equal spacing intervals on the right side of the inclined portion 72 in the seat width direction. These through-holes 73 are rectangular elongated holes, and are formed in a shape inclined with respect to the seat width direction. Note that the through-holes 73 are provided at positions overlapping with the front wall portion 13B in the seat front-to-back direction. Moreover, as illustrated in FIG. 10, at least one (e.g., the outermost through-hole 73) of the through-holes 73 is positioned on the outside of the headrest attachment portion 17.

As illustrated in FIG. 9, a spacing interval between the inclined portion 72 and the front wall portion 13B gradually expands from bottom up. With this configuration, a lower portion of the lower frame 13 can be compactly configured. Moreover, as illustrated in FIG. 9, a section of the back wall portion 13A, a section of the front wall portion 13B, and a section of the coupling portion 13C that are located in an area where the inclined portion 72 is provided, overlap with each side frame 12 as viewed laterally. Specifically, the section of the back wall portion 13A, the section of the front wall portion 13B, and the section of the coupling portion 13C that are located in the area where the inclined portion 72 is provided, are provided within an area which, as viewed laterally, do not protrude past the side frame 12 respectively. Moreover, as illustrated in FIG. 9, an upper end of the back wall portion 13A is positioned higher than that of the front wall portion 13B. Moreover, the lower end of the support portion 15A is positioned higher than the upper end of the front wall portion 13B and lower than the upper end of the back wall portion 13A. Further, as illustrated in FIG. 9, the front wall portion 13B is positioned in front of the rotary shaft 16 rotatably coupling the seat back frame 10 and the seat cushion frame 20 together, and the back wall portion 13A including the inclined portion 72 is positioned behind the rotary shaft 16. That is, in the lower frame 13, the back wall portion 13A and the front wall portion 13B are arranged at such positions that the back wall portion 13A and the front wall portion 13B sandwich the rotary shaft 16 in the seat front-to-back direction. In addition, as illustrated in FIG. 9, the front wall portion 13B is provided substantially parallel with the support portion 15A. Note that the support portion 15A is substantially parallel with the torso line T, and therefore, the front wall portion 13B is, in other words, provided substantially parallel with the torso line T.

As illustrated in FIG. 10, the inclined portion 72 is, as viewed laterally, on the inside of the reclining units 40 configured to control rotation of the seat back frame 10 relative to the seat cushion frame 20. Moreover, the inclined portion 72 is, as viewed laterally, provided at a position overlapping with a welding portion 52 between the reclining unit 40 and the side frame 12.

Further, as illustrated in FIG. 9, the coupling pipe 23, as an attachment portion to which the pressure receiving member 24 of the seat cushion frame 20 is to be attached, is positioned in front of the seat with respect to a plane extending from the inclined portion 72.

As illustrated in FIG. 8, an upwardly-protruding upper protrusion 75 is provided at each of upper portions of the side portion 70A and the side portion 70B. Each upper protrusion 75 is formed in a shape formed along a corresponding one of the side frames 12, and a reinforcement portion 74 is formed at a position facing the back reinforcement portion 30D of a corresponding one of the side frames 12. Note that each reinforcement portion 74 is formed as a bead portion recessed forward from the seat, and is in a shape engageable with the back reinforcement portion 30D. Moreover, right and left end portions of the inclined portion 72 are positioned on the inside of the right and left upper protrusions 75 in the seat width direction. Note that the side portion 70A and the side portion 70B are each joined to the side frames 12 by welding.

In the seat frame 1, the inclined portion 72 positioned in front of the side portion 70A and the side portion 70B is provided between the side portion 70A and the side portion 70B which are each along the shapes of the side frames 12, and therefore, a space at the periphery of the lower frame 13 at the back portion of the seat frame 1 can be expanded. Thus, a space where the feet of the occupant seated on a back seat are placed can be expanded at a front vehicle seat using the seat frame 1.

Moreover, as illustrated in FIG. 11, the recessed portion 76 recessed backward from the seat is formed at a lower surface of the lower frame 13 at a coupling portion between the coupling portion 13C and the side portion 70B. Note that a similar recessed portion 76 is also formed at a coupling portion between the coupling portion 13C and the side portion 70A. As illustrated in FIG. 11, an inner end portion of the recessed portion 76 in the seat width direction is positioned on the inside of the side portion 70B (i.e., the upper protrusion 75) in the seat width direction. Moreover, the recessed portion 76 on a side portion 70B side is provided at a position overlapping with the connection portion 71B in the seat front-to-back direction. Similarly, the recessed portion 76 on a side portion 70A side is provided at a position overlapping with the connection portion 71A in the seat front-to-back direction.

According to the seat frame 1 of the present embodiment described above, the first reinforcement portion 30A, the second reinforcement portion 30B, and the third reinforcement portion 30C are provided at the side frame side portion 12A of each side frame 12, and therefore, the stiffness of the side frames 12 can be improved. The first reinforcement portion 30A, the second reinforcement portion 30B, and the third reinforcement portion 30C described herein are different from each other in an extension direction, and therefore, the stiffness against load input from various directions can be improved.

Moreover, according to the seat frame 1, the attachment portions 51 for the pressure receiving member 15 are provided at the front wall portion 13B of the lower frame 13, and therefore, workability in attachment of the pressure receiving member 15 can be improved. Further, for the attachment portions 51 of the front wall portion 13B, the reinforcement portions are provided on the upper and lower sides so that the stiffness of the periphery of each attachment portion 51 can be improved.

In addition, according to the seat frame 1, the inclined portion 72 is provided at a center portion of the back wall portion 13A of the lower frame 13, and therefore, the space at the periphery of the lower frame 13 at a back surface of the seat frame 1 can be expanded. Thus, the space where the feet of the occupant seated on the back seat are placed can be expanded at the front vehicle seat using the seat frame 1.

5. Variations

The present disclosure is not limited to the above-described embodiment. Variations of the reinforcement portions (bead shapes) formed at the side frame side portion 12A of each side frame 12 are described below with reference to FIGS. 12A to 12D. FIGS. 12A to 12D each illustrate outer views of the side frames 12 of the variations.

Figure 12A:
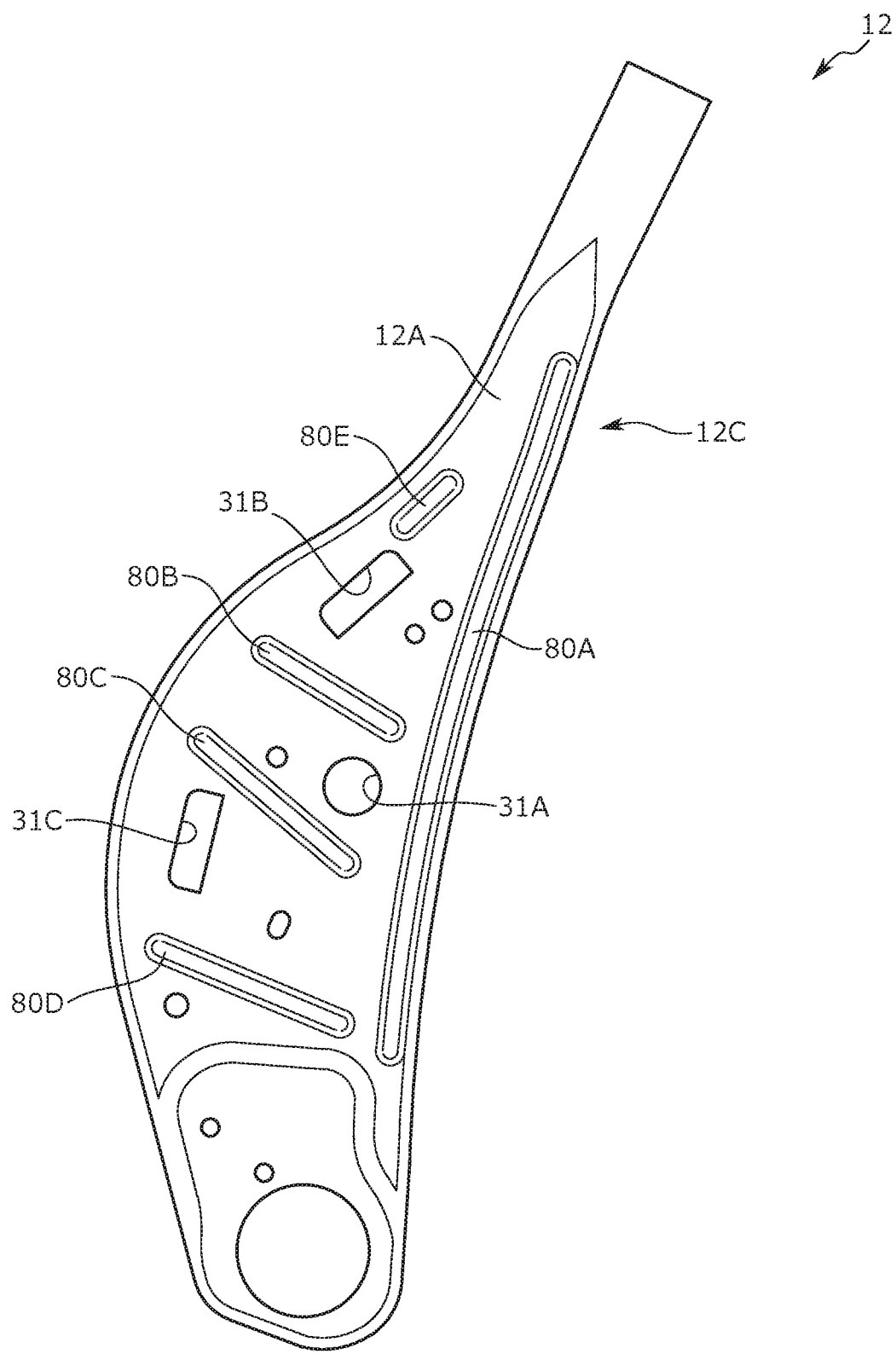
FIG. 12A is a side view of a variation of reinforcement portions provided at the side frame.

First, the side frame 12 of the first variation is described. As illustrated in FIG. 12A, a reinforcement portion 80A, a reinforcement portion 80B, a reinforcement portion 80C, a reinforcement portion 80D, and a reinforcement portion 80E are formed at the side frame 12 of the first variation. Each of the reinforcement portion 80A, the reinforcement portion 80B, the reinforcement portion 80C, the reinforcement portion 80D, and the reinforcement portion 80E described herein is formed as a bead portion such that the side frame side portion 12A is recessed inward of the seat by pressing. The reinforcement portion 80A is provided along the back edge 12C of the side frame side portion 12A. The reinforcement portion 80B is provided to extend in the seat front-to-back direction between the airbag attachment hole 31A and the airbag attachment hole 31B. The reinforcement portion 80C is provided to extend in the seat front-to-back direction between the airbag attachment hole 31A and the airbag attachment hole 31C. The reinforcement portion 80D is provided to extend in the seat front-to-back direction below the airbag attachment hole 31C. The reinforcement portion 80E is provided above the airbag attachment hole 31B along the front edge of the side frame side portion 12A.

As illustrated in FIG. 12A, any of the reinforcement portion 80A, the reinforcement portion 80B, the reinforcement portion 80C, the reinforcement portion 80D, and the reinforcement portion 80E are not necessarily coupled with other reinforcement portions, and may be each provided as independent bead portions. Moreover, the reinforcement portion 80A, the reinforcement portion 80B, the reinforcement portion 80C, the reinforcement portion 80D, and the reinforcement portion 80E may be different from each other in their respective extension directions.

Figure 12B:
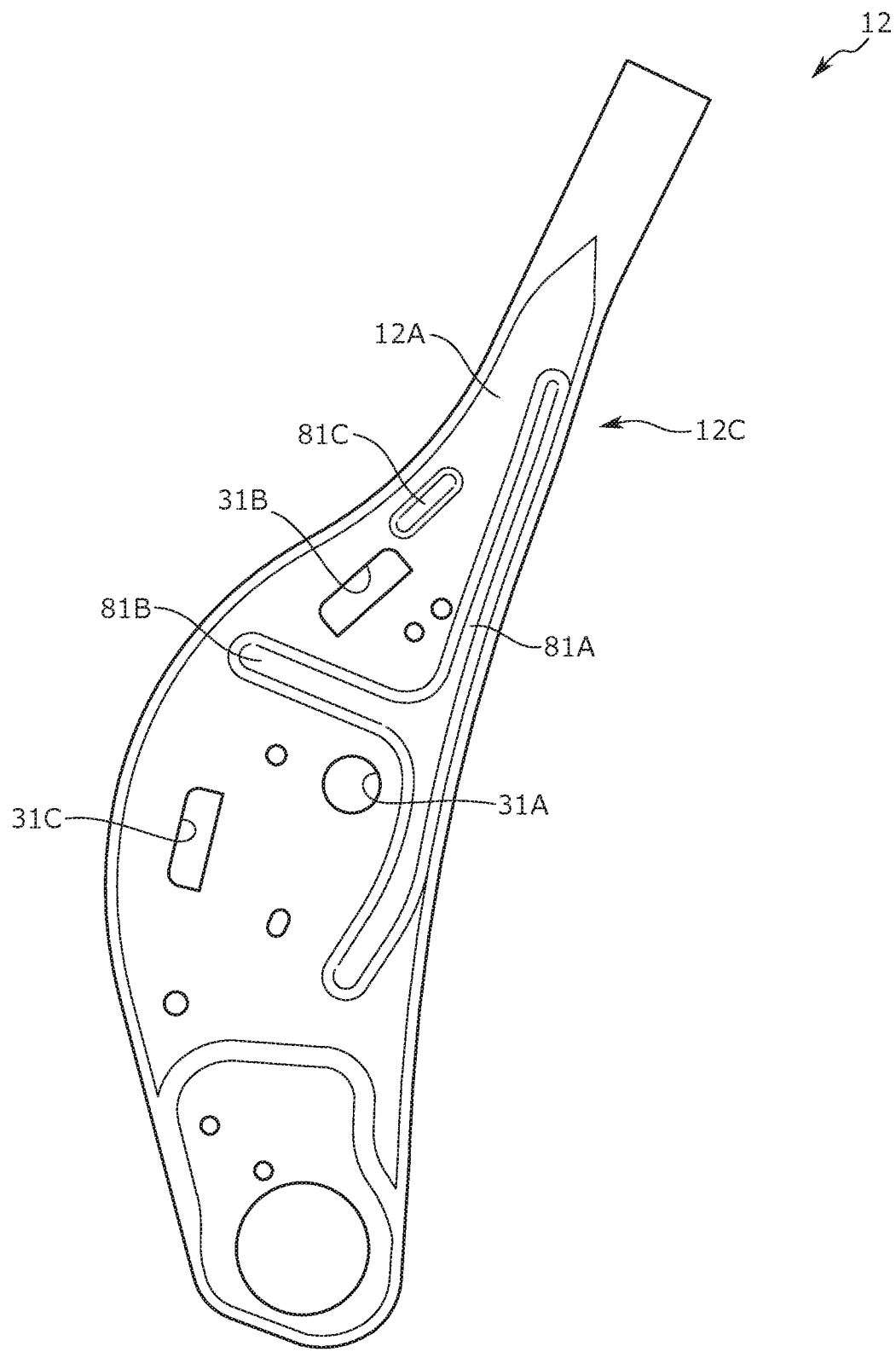
FIG. 12B is a side view of another variation of the reinforcement portions provided at the side frame.

Next, the side frame 12 of the second variation is described. As illustrated in FIG. 12B, a reinforcement portion 81A, a reinforcement portion 81B, and a reinforcement portion 81C are formed at the side frame 12 of the second variation. Each of the reinforcement portion 81A, the reinforcement portion 81B, and the reinforcement portion 81C described herein is formed as a bead portion such that the side frame side portion 12A is recessed inward of the seat by pressing. The reinforcement portion 81A is provided along the back edge 12C of the side frame side portion 12A. Note that a lower end of the reinforcement portion 81A is bent inward of the seat. The reinforcement portion 81B is provided to extend in the seat front-to-back direction between the airbag attachment hole 31A and the airbag attachment hole 31B. Moreover, a back end of the reinforcement portion 81B is coupled with the reinforcement portion 81A. The reinforcement portion 81C is provided above the airbag attachment hole 31B along the front edge of the side frame side portion 12A.

Figure 12C:
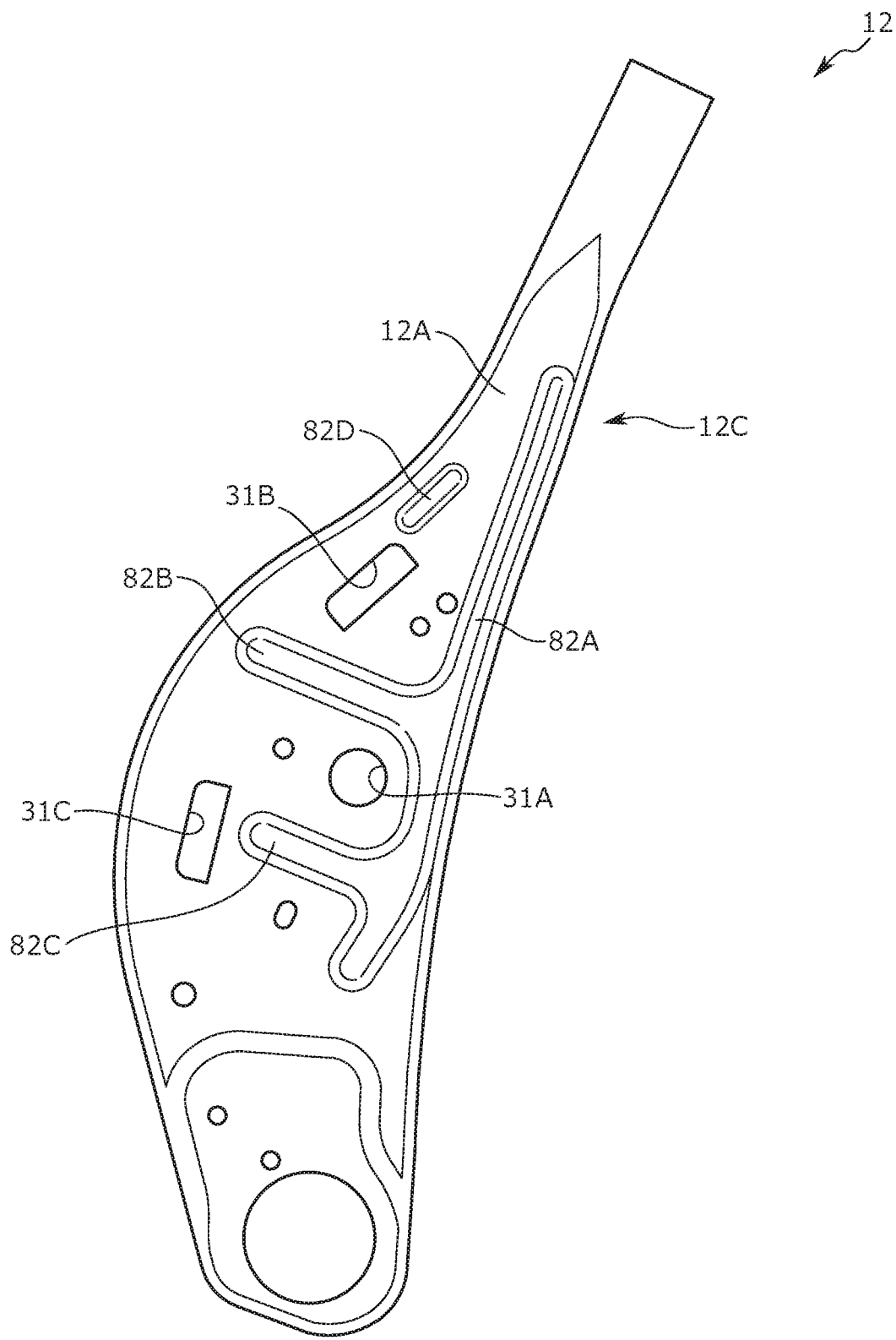
FIG. 12C is a side view of still another variation of the reinforcement portions provided at the side frame.

Next, the side frame 12 of the third variation is described. As illustrated in FIG. 12C, a reinforcement portion 82A, a reinforcement portion 82B, a reinforcement portion 82C, and a reinforcement portion 82D are formed at the side frame 12 of the third variation. Each of the reinforcement portion 82A, the reinforcement portion 82B, the reinforcement portion 82C, and the reinforcement portion 82D described herein is formed as a bead portion such that the side frame side portion 12A is recessed inward of the seat by pressing. The reinforcement portion 82A is provided along the back edge 12C of the side frame side portion 12A. Note that a lower end of the reinforcement portion 82A is bent inward of the seat. The reinforcement portion 82B is provided to extend in the seat front-to-back direction between the airbag attachment hole 31A and the airbag attachment hole 31B. Moreover, a back end of the reinforcement portion 82B is coupled with the reinforcement portion 82A. The reinforcement portion 82C is provided to extend in the seat front-to-back direction from a bent portion of the reinforcement portion 82A to the airbag attachment hole 31C. Moreover, a back end of the reinforcement portion 82C is coupled with the reinforcement portion 82A. The reinforcement portion 82D is provided above the airbag attachment hole 31B along the front edge of the side frame side portion 12A.

Figure 12D:
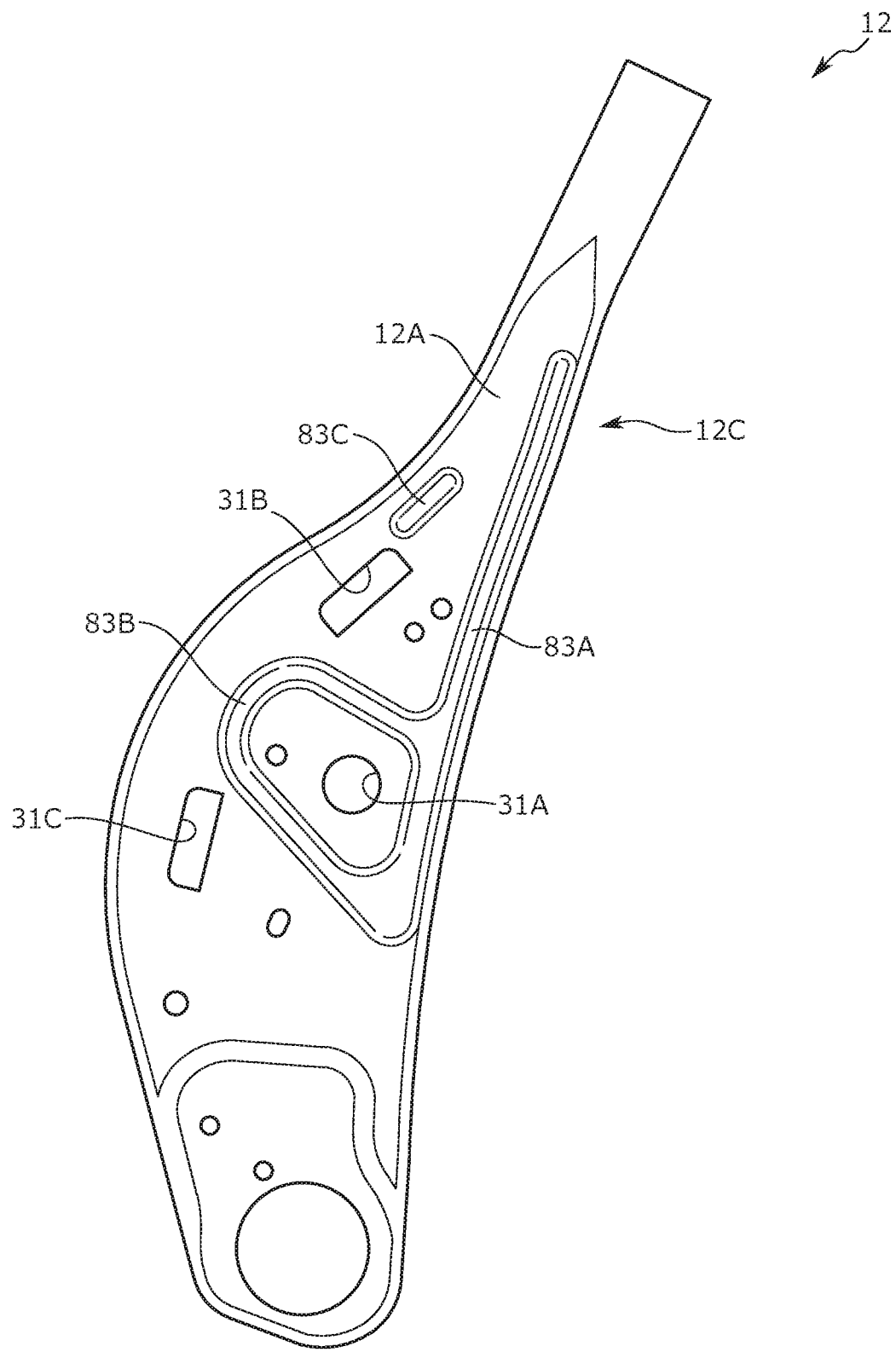
FIG. 12D is a side view of still another variation of the reinforcement portions provided at the side frame.

Lastly, the side frame 12 of the fourth variation is described. As illustrated in FIG. 12D, a reinforcement portion 83A, a reinforcement portion 83B, and a reinforcement portion 83C are formed at the side frame 12 of the fourth variation. Each of the reinforcement portion 83A, the reinforcement portion 83B, and the reinforcement portion 83C described herein is formed as a bead portion such that the side frame side portion 12A is recessed inward of the seat by pressing. The reinforcement portion 83A is provided along the back edge 12C of the side frame side portion 12A. The reinforcement portion 83B is formed in a circular ring shape, and a back end portion of the reinforcement portion 83B is coupled with the reinforcement portion 83A. Moreover, the reinforcement portion 83B is formed between the airbag attachment hole 31A and each of the airbag attachment hole 31B and the airbag attachment hole 31C, and surrounds the airbag attachment hole 31A. The reinforcement portion 83C is provided above the airbag attachment hole 31B along the front edge of the side frame side portion 12A.

TABLE OF REFERENCE NUMERALS 1 seat frame
10 seat back frame
11 upper frame
11A upper frame side portion
12 side frame
12A side frame side portion
12B side frame back portion
12C back edge
12D wide portion
13 lower frame
13A back wall portion
13B front wall portion
13C coupling portion
14 cross member
14A recessed portion
15 pressure receiving member
15A support portion
15B wire
15C wire
16 rotary shaft
17 headrest attachment portion
18 first coupling bracket
18A weak portion
18B shaft through-hole
18C bolt fastening hole
18D bolt fastening hole
18AB first connection part
18AD second connection part
19 second coupling bracket
19A weak portion
19B shaft through-hole
19C bolt fastening hole
19D bolt fastening hole
19E weak portion
19AB first connection part
19AD second connection part
20 seat cushion frame
21 pan frame
22 cushion side frame
23 coupling pipe
24 pressure receiving member 30A first reinforcement portion
30B second reinforcement portion
30C third reinforcement portion
30D back reinforcement portion
31A airbag attachment hole
31B airbag attachment hole
31C airbag attachment hole
31D through-hole
31E through-hole
31F through-hole
40 reclining unit
41 height adjustment unit
50 clip
51 attachment portion
52 welding portion
60A upper reinforcement portion
60B upper reinforcement portion
60C upper reinforcement portion
61A lower reinforcement portion
61B lower reinforcement portion
61C lower reinforcement portion
61D lower reinforcement portion
61E lower reinforcement portion
61F lower reinforcement portion
70A side portion
70B side portion
71A connection portion
71B connection portion
72 inclined portion
72A reinforcement portion
73 through-hole
74 reinforcement portion
75 upper protrusion
76 recessed portion
77A inner portion
77B inner portion
78A outer portion
78B outer portion
80A reinforcement portion
80B reinforcement portion
80C reinforcement portion
80D reinforcement portion
80E reinforcement portion
81A reinforcement portion
81B reinforcement portion
81C reinforcement portion
82A reinforcement portion
82B reinforcement portion
82C reinforcement portion
82D reinforcement portion
83A reinforcement portion
83B reinforcement portion
83C reinforcement portion
T torso line

What is claimed is:

1. A seat frame comprising:
a lower frame configured to couple lower portions of side frames arranged on right and left sides; and
a pressure receiving member configured to support an occupant;
wherein:
the lower frame includes
a back wall portion provided on a back side,
a front wall portion provided in front of the back wall portion, and
a coupling portion that couples lower ends of the back wall portion and the front wall portion;
the back wall portion includes
a pair of side portions forming ends in a seat width direction and each side portion of the pair formed along outer shapes of the side frames, and
an inclined portion provided between the side portions and inclined such that a lower end of the inclined portion is positioned in front of an upper end of the inclined portion;
the inclined portion is provided in front of the side portions; and
an attachment portion to which the pressure receiving member is attached is provided at the front wall portion of the lower frame.

2. The seat frame according to claim 1, wherein
a reinforcement portion is provided at the inclined portion.

3. The seat frame according to claim 1, wherein
respective connection portions configured to connect the inclined portion and each corresponding side portion together are provided,
each of the connection portions includes an inner portion configured to connect the inclined portion and the connection portion, and an outer portion configured to connect the connection portion and the corresponding side portion, and
the inner portion is positioned in front of the outer portion.

4. The seat frame according to claim 1, wherein
a spacing interval between the inclined portion and the front wall portion gradually expands from bottom up.

5. The seat frame according to claim 1, further comprising:
a rotary shaft configured to rotatably couple a seat back frame and a seat cushion frame together,
wherein the back wall portion is provided behind the rotary shaft, and
the front wall portion is provided in front of the rotary shaft.

6. The seat frame according to claim 1, wherein
the front wall portion is provided substantially parallel with a support surface configured to support an occupant.

7. The seat frame according to claim 1, wherein
an end portion of the lower frame in the seat width direction is formed in a shape along each side frame, and
a section of the back wall portion, a section of the front wall portion, and a section of the coupling portion in an area where the inclined portion is provided overlap with each side frame as viewed laterally.

8. The seat frame according to claim 1, further comprising:
a reclining unit configured to control rotation of a seat back frame relative to a seat cushion frame,
wherein the inclined portion is, as viewed laterally, provided on an inside of the reclining unit.

9. The seat frame according to claim 8, wherein
the reclining unit is welded to each side frame, and
the inclined portion is, as viewed laterally, provided at a position that overlaps with a welding position between the reclining unit and each side frame.

10. The seat frame according to claim 1, wherein
an end of the inclined portion in the seat width direction is positioned an outside of the pressure receiving member.

11. The seat frame according to claim 1, wherein
an attachment portion for a pressure receiving member of a seat cushion frame is positioned in front of a plane that extends from the inclined portion.

* * * * *